(12) United States Patent
Salloum et al.

(10) Patent No.: US 11,384,517 B2
(45) Date of Patent: Jul. 12, 2022

(54) SYSTEMS AND METHODS TO PRODUCE LIQUID WATER EXTRACTED FROM AIR

(71) Applicant: Zero Mass Water, Inc., Tempe, AZ (US)

(72) Inventors: Kamil Salloum, Tempe, AZ (US); Heath Lorzel, Tempe, AZ (US); Michael Robinson, Tempe, AZ (US); Grant Friesen, Tempe, AZ (US); Jonathan Goldberg, Tempe, AZ (US); Cody Friesen, Tempe, AZ (US)

(73) Assignee: Source Global, PBC, Scottsdale, AZ (US)

( * ) Notice: Subject to any disclaimer, the term of this patent is extended or adjusted under 35 U.S.C. 154(b) by 306 days.

(21) Appl. No.: 16/644,487

(22) PCT Filed: Sep. 4, 2018

(86) PCT No.: PCT/US2018/049398
§ 371 (c)(1),
(2) Date: Mar. 4, 2020

(87) PCT Pub. No.: WO2019/050861
PCT Pub. Date: Mar. 14, 2019

(65) Prior Publication Data
US 2020/0283997 A1  Sep. 10, 2020

Related U.S. Application Data

(60) Provisional application No. 62/554,231, filed on Sep. 5, 2017.

(51) Int. Cl.
*B01D 53/04* (2006.01)
*B01D 53/06* (2006.01)
(Continued)

(52) U.S. Cl.
CPC ............ *E03B 3/28* (2013.01); *B01D 53/0438* (2013.01); *B01D 53/0454* (2013.01);
(Continued)

(58) Field of Classification Search
CPC ................ B01D 53/04; B01D 53/0438; B01D 53/0454; B01D 53/06; B01D 53/261;
(Continued)

(56) References Cited

U.S. PATENT DOCUMENTS

| 1,816,592 A | 7/1931 | Knapen |
| 2,138,689 A | 11/1938 | Altenkirch |

(Continued)

FOREIGN PATENT DOCUMENTS

| CN | 1774401 | 5/2006 |
| CN | 1325854 | 7/2007 |

(Continued)

OTHER PUBLICATIONS

USPTO, Notice of Allowance dated Jun. 19, 2020 in U.S. Appl. No. 15/528,366.
(Continued)

*Primary Examiner* — Frank M Lawrence, Jr.
(74) *Attorney, Agent, or Firm* — Snell & Wilmer L.L.P.

(57) ABSTRACT

This disclosure relates to techniques for producing liquid water from ambient air. In certain embodiments, a system includes a regeneration fluid pathway configured to receive a regeneration fluid and a thermal unit configured to heat the regeneration fluid. The system can further include a continuous desiccant unit that comprises an adsorption zone and a desorption zone, as well as a batch desiccant unit that includes a regeneration inlet and a batch desiccant housing. The batch desiccant housing can include a batch desiccant inlet configured to input the ambient air, a batch desiccant outlet configured to output a batch output fluid, and a batch
(Continued)

desiccant material. A condenser unit can be configured to produce liquid water from the regeneration fluid, and the system can maximize a water production rate of the condenser unit based on an amount of heat carried by the regeneration fluid.

31 Claims, 13 Drawing Sheets

(51) Int. Cl.
  *E03B 3/28* (2006.01)
  *B01D 53/26* (2006.01)
(52) U.S. Cl.
  CPC ........... *B01D 53/06* (2013.01); *B01D 53/261* (2013.01); *B01D 2257/80* (2013.01); *B01D 2259/4009* (2013.01)
(58) Field of Classification Search
  CPC ........ B01D 2257/80; B01D 2259/4009; E03B 3/28; Y02A 20/00; F24F 3/1423
  USPC .......... 95/10, 14, 15, 19, 114, 115, 117–119, 95/121–126; 96/121, 131, 132, 109, 111, 96/112, 143–146
  See application file for complete search history.

(56) References Cited

U.S. PATENT DOCUMENTS

| | | |
|---|---|---|
| 2,462,952 A | 3/1949 | Dunkak |
| 2,700,537 A | 1/1955 | Pennington |
| 2,761,292 A | 9/1956 | Coanda et al. |
| 3,102,532 A | 9/1963 | Shoemaker |
| 3,400,515 A | 9/1968 | Ackerman |
| 3,676,321 A | 7/1972 | Cummings et al. |
| 3,740,959 A | 6/1973 | Foss |
| 3,844,737 A * | 10/1974 | Macriss ............... B01D 53/06 95/93 |
| 3,889,532 A | 6/1975 | Pilie et al. |
| 4,054,124 A | 10/1977 | Knoos |
| 4,080,186 A | 3/1978 | Ockert |
| 4,117,831 A | 10/1978 | Bansal et al. |
| 4,134,743 A | 1/1979 | Macriss et al. |
| 4,136,672 A | 1/1979 | Hallanger |
| 4,146,372 A | 3/1979 | Groth et al. |
| 4,169,459 A | 10/1979 | Ehrlich |
| 4,185,969 A | 1/1980 | Bulang |
| 4,201,195 A | 5/1980 | Sakhuja |
| 4,219,341 A | 8/1980 | Hussmann |
| 4,222,244 A | 9/1980 | Meckler |
| 4,234,037 A | 11/1980 | Rogers et al. |
| 4,242,112 A | 12/1980 | Jebens |
| 4,285,702 A | 8/1981 | Michel et al. |
| 4,304,577 A | 12/1981 | Ito et al. |
| 4,315,599 A | 2/1982 | Biancardi |
| 4,342,569 A | 8/1982 | Hussmann |
| 4,345,917 A | 8/1982 | Hussmann |
| 4,351,651 A | 9/1982 | Courneya |
| 4,374,655 A | 2/1983 | Grodzka et al. |
| 4,377,398 A | 3/1983 | Bennett |
| 4,398,927 A | 8/1983 | Asher et al. |
| 4,405,343 A | 9/1983 | Othmer |
| 4,433,552 A | 2/1984 | Smith |
| 4,478,210 A | 10/1984 | Sieradski |
| 4,722,192 A | 2/1988 | Koblitz et al. |
| 4,726,817 A | 2/1988 | Roger |
| 4,926,618 A | 5/1990 | Ratliff |
| 5,058,388 A | 10/1991 | Shaw et al. |
| 5,275,643 A | 1/1994 | Usui |
| 5,579,647 A | 12/1996 | Calton et al. |
| 5,701,749 A | 12/1997 | Zakryk |
| 5,729,981 A | 3/1998 | Markus et al. |
| 5,758,511 A | 6/1998 | Yoho et al. |
| 5,846,296 A | 12/1998 | Krumsvik |
| 5,873,256 A | 2/1999 | Denniston |
| 5,989,313 A | 11/1999 | Mize |
| 6,029,467 A | 2/2000 | Moratalla |
| 6,156,102 A | 12/2000 | Contad et al. |
| 6,199,388 B1 | 3/2001 | Fischer, Jr. |
| 6,336,957 B1 | 1/2002 | Tsymerman |
| 6,447,583 B1 | 9/2002 | Thelen et al. |
| 6,490,879 B1 | 12/2002 | Lloyd et al. |
| 6,511,525 B2 | 1/2003 | Spletzer et al. |
| 6,513,339 B1 | 2/2003 | Kopko |
| 6,557,365 B2 | 5/2003 | Dinnage et al. |
| 6,574,979 B2 | 6/2003 | Faqih |
| 6,644,060 B1 | 11/2003 | Dagan |
| 6,828,499 B2 | 12/2004 | Max |
| 6,869,464 B2 | 3/2005 | Klemic |
| 6,945,063 B2 | 9/2005 | Max |
| 6,957,543 B1 | 10/2005 | Reznik |
| 7,017,356 B2 | 3/2006 | Moffitt |
| 7,043,934 B2 | 5/2006 | Radermacher et al. |
| 7,178,355 B2 | 2/2007 | Moffitt |
| 7,251,945 B2 | 8/2007 | Tongue |
| 7,305,849 B2 | 12/2007 | Loffler et al. |
| 7,306,654 B2 | 12/2007 | King et al. |
| 7,478,535 B2 | 1/2009 | Turner, Jr. et al. |
| 7,740,765 B2 | 6/2010 | Mitchell |
| 7,866,176 B2 | 1/2011 | Vetrovec et al. |
| 7,905,097 B1 | 3/2011 | Fort |
| 7,926,481 B2 | 4/2011 | Edwards et al. |
| 8,075,652 B2 | 12/2011 | Melikyan |
| 8,118,912 B2 | 2/2012 | Rodriguez et al. |
| 8,187,368 B2 | 5/2012 | Shih |
| 8,196,422 B2 | 6/2012 | Ritchey |
| 8,328,904 B2 | 12/2012 | Griffiths et al. |
| 8,425,660 B2 | 4/2013 | Ike et al. |
| 8,506,675 B2 | 8/2013 | Ellsworth |
| 8,844,299 B2 | 9/2014 | Ferreira et al. |
| 9,289,718 B2 | 3/2016 | Dahlback |
| 10,357,739 B2 | 7/2019 | Friesen et al. |
| 10,469,028 B2 | 11/2019 | Friesen et al. |
| 10,835,861 B2 | 11/2020 | Friesen et al. |
| 11,159,123 B2 | 10/2021 | Friesen et al. |
| 11,160,223 B2 | 11/2021 | Friesen et al. |
| 2003/0091881 A1 | 5/2003 | Eisler |
| 2003/0101161 A1 | 5/2003 | Ferguson et al. |
| 2004/0000165 A1 | 1/2004 | Max |
| 2004/0055309 A1 | 3/2004 | Bellows et al. |
| 2005/0044862 A1 | 3/2005 | Vetrovec et al. |
| 2005/0084415 A1 | 4/2005 | McVey et al. |
| 2005/0204914 A1 | 9/2005 | Boutall |
| 2005/0249631 A1 | 11/2005 | Schulz et al. |
| 2005/0284167 A1 | 12/2005 | Morgan |
| 2006/0017740 A1 | 1/2006 | Coleman |
| 2006/0032493 A1 | 2/2006 | Ritchey |
| 2006/0060475 A1 | 3/2006 | Applegate et al. |
| 2006/0112709 A1 | 6/2006 | Boyle |
| 2006/0130654 A1 | 6/2006 | King et al. |
| 2006/0288709 A1 | 12/2006 | Reidy |
| 2007/0028769 A1 | 2/2007 | Eplee et al. |
| 2007/0101862 A1 | 5/2007 | Tongue |
| 2007/0150424 A1 | 6/2007 | Igelnik |
| 2007/0274858 A1 | 11/2007 | Childers et al. |
| 2007/0295021 A1 | 12/2007 | Tyls et al. |
| 2008/0135495 A1 | 6/2008 | Sher |
| 2008/0168789 A1 | 7/2008 | Jones |
| 2008/0224652 A1 | 9/2008 | Zhu et al. |
| 2008/0289352 A1 | 11/2008 | Parent |
| 2009/0025711 A1 | 1/2009 | Edwards et al. |
| 2009/0093916 A1 | 4/2009 | Parsonnet et al. |
| 2009/0211276 A1 | 8/2009 | Forkosh |
| 2009/0223514 A1 | 9/2009 | Smith et al. |
| 2010/0083673 A1 | 4/2010 | Meritt |
| 2010/0170499 A1 | 7/2010 | Bar |
| 2010/0192605 A1 | 8/2010 | Fang et al. |
| 2010/0212348 A1 | 8/2010 | Oh |
| 2010/0275629 A1 | 11/2010 | Erickson |
| 2010/0275775 A1 | 11/2010 | Griffiths et al. |
| 2011/0048039 A1 | 3/2011 | Kohavi et al. |
| 2011/0056220 A1 | 3/2011 | Caggiano |

(56) References Cited

U.S. PATENT DOCUMENTS

| | | | |
|---|---|---|---|
| 2011/0083458 A1 | 4/2011 | Takakura et al. | |
| 2011/0232485 A1 | 9/2011 | Ellsworth | |
| 2011/0247353 A1 | 10/2011 | Metz | |
| 2011/0296858 A1* | 12/2011 | Caggiano | B01D 53/28 62/94 |
| 2012/0006193 A1 | 1/2012 | Roychoudhury | |
| 2012/0125020 A1 | 5/2012 | Vandermeulen et al. | |
| 2012/0227582 A1 | 9/2012 | Wamstad et al. | |
| 2013/0227879 A1 | 9/2013 | Lehky | |
| 2013/0269522 A1 | 10/2013 | DeValve | |
| 2013/0312451 A1 | 11/2013 | Max | |
| 2013/0318790 A1 | 12/2013 | Becze et al. | |
| 2013/0319022 A1 | 12/2013 | Becze et al. | |
| 2014/0034475 A1 | 2/2014 | Kamen et al. | |
| 2014/0110273 A1 | 4/2014 | Bar-or et al. | |
| 2014/0138236 A1 | 5/2014 | White | |
| 2014/0157985 A1 | 6/2014 | Scovazzo et al. | |
| 2014/0173769 A1 | 6/2014 | Leyns et al. | |
| 2014/0317029 A1 | 10/2014 | Matsuoka et al. | |
| 2015/0033774 A1 | 2/2015 | Ferreira et al. | |
| 2015/0194926 A1 | 7/2015 | Bushong, Jr. | |
| 2016/0073589 A1 | 3/2016 | McNamara | |
| 2016/0131401 A1 | 5/2016 | Otanicar et al. | |
| 2016/0162456 A1 | 6/2016 | Munro et al. | |
| 2016/0197364 A1 | 7/2016 | Rama | |
| 2016/0244951 A1 | 8/2016 | Yui | |
| 2016/0333553 A1 | 11/2016 | Dorfman | |
| 2017/0013810 A1 | 1/2017 | Grabell | |
| 2017/0024641 A1 | 1/2017 | Wierzynski | |
| 2017/0203974 A1 | 7/2017 | Riedl et al. | |
| 2017/0323221 A1 | 11/2017 | Chaudhuri et al. | |
| 2017/0354920 A1 | 12/2017 | Friesen et al. | |
| 2017/0371544 A1 | 12/2017 | Choi et al. | |
| 2018/0043295 A1 | 2/2018 | Friesen et al. | |
| 2019/0102695 A1 | 4/2019 | Biswas et al. | |
| 2019/0171967 A1 | 6/2019 | Friesen et al. | |
| 2019/0254243 A1 | 8/2019 | Friesen et al. | |
| 2019/0336907 A1 | 11/2019 | Friesen et al. | |
| 2019/0344214 A1 | 11/2019 | Friesen et al. | |
| 2019/0372520 A1 | 12/2019 | Friesen et al. | |
| 2020/0140299 A1 | 5/2020 | Friesen et al. | |
| 2020/0209190 A1 | 7/2020 | Johnson et al. | |
| 2020/0269184 A1 | 8/2020 | Friesen et al. | |
| 2020/0283997 A1 | 9/2020 | Salloum et al. | |
| 2020/0300128 A1 | 9/2020 | Friesen et al. | |
| 2021/0062478 A1 | 3/2021 | Friesen et al. | |
| 2021/0305935 A1 | 9/2021 | Friesen et al. | |

FOREIGN PATENT DOCUMENTS

| | | |
|---|---|---|
| CN | 102422089 | 4/2012 |
| CN | 103889892 | 6/2014 |
| CN | 203777907 | 8/2014 |
| CN | 204510348 U | 7/2015 |
| CN | 105531547 | 4/2016 |
| DE | 4215839 | 11/1993 |
| EP | 1139554 | 10/2001 |
| EP | 2305362 | 4/2011 |
| EP | 2326890 | 6/2011 |
| FR | 2813087 | 2/2002 |
| JP | H06142434 | 5/1994 |
| JP | 2012101169 | 5/2012 |
| WO | 1999007951 | 2/1999 |
| WO | 2006129200 | 12/2006 |
| WO | 2007041804 | 4/2007 |
| WO | 2007051886 | 5/2007 |
| WO | 2008018071 | 2/2008 |
| WO | 2009043413 | 4/2009 |
| WO | 2012009024 | 1/2012 |
| WO | 2012128619 | 9/2012 |
| WO | 2012162760 | 12/2012 |
| WO | 2013026126 | 2/2013 |
| WO | 2013182911 | 12/2013 |
| WO | 2014085860 | 6/2014 |
| WO | 2015054435 | 4/2015 |
| WO | 2016081863 | 5/2016 |
| WO | 2016138075 | 9/2016 |
| WO | 2016187709 | 12/2016 |
| WO | 2017177143 | 10/2017 |
| WO | 2017201405 | 11/2017 |
| WO | 2019014599 | 1/2019 |
| WO | 2019050861 | 3/2019 |
| WO | 2019050866 | 3/2019 |
| WO | 2019071202 | 4/2019 |
| WO | 2019113354 | 6/2019 |
| WO | 2019161339 | 8/2019 |
| WO | 2021154739 | 8/2021 |

OTHER PUBLICATIONS

International Search Report and Written Opinion dated Jun. 15, 2020 in Application No. PCT/US2020/029401.
Non-Final Office Action dated Jul. 20, 2021 in U.S. Appl. No. 16/211,896.
Non-Final Office Action dated Jul. 26, 2021 in U.S. Appl. No. 16/630,824.
Non-Final Office Action dated Aug. 24, 2021 in U.S. Appl. No. 16/657,935.
Office Action dated Jul. 15, 2021 in Japanese Patent Application No. 2019-503636.
Office Action dated Aug. 4, 2021 in Chinese Application No. 201780033378.3.
PV Performance Modeling Collaborative. Irradiance & Insolation. Accessed Aug. 18, 2021 at https://pvpmc.sandia.gov/ modeling-steps/1-weather-design-inputs/irradiance-and-insolation-2/ (2014).
ACS. A Single-Layer Atmosphere Model. Accessed on Aug. 17, 2021 at https://www.acs.org/content/acs/en/ climatescience/ atmosphericwarming/singlelayermodel.html (2012).
Materials Technology. UV Exposure Across Surface of Earth. Accessed Aug. 17, 2021 at http://www.drb-mattech.co.uk/uv %20map. html (2010).
Non-Final Office Action dated Jan. 17, 2020 in U.S. Appl. No. 15/528,366.
Notice of Allowance dated Jun. 3, 2019 in U.S. Appl. No. 15/600,046.
Non-Final Office Action dated Feb. 5, 2019 in U.S. Appl. No. 15/482,104.
Notice of Allowance dated Jun. 27, 2019 in U.S. Appl. No. 15/482,104.
Non-Final Office Action dated Aug. 9, 2019 in U.S. Appl. No. 16/517,435.
Notice of Allowance dated Jan. 31, 2020 in U.S. Appl. No. 16/517,435.
International Search Report and Written Opinion dated Apr. 29, 2016 in Application No. PCT/US2015/061921.
International Search Report and Written Opinion in dated Aug. 16, 2017 in Application No. PCT/US2017/033540.
International Search Report and Written Opinion dated Jun. 19, 2017 in Application No. PCT/US2017/026609.
International Search Report and Written Opinion dated Dec. 3, 2018 in Application No. PCT/US2018/049411.
International Search Report and Written Opinion dated Dec. 3, 2018. Application No. PCT/US2018/049398.
International Search Report and Written Opinion dated Jan. 15, 2019 in Application No. PCT/US2018/054715.
International Search Report and Written Opinion dated Mar. 6, 2019 in Application No. PCT/US2018/042098.
International Search Report and Written Opinion dated Mar. 29, 2019 in Application No. PCT/US2018/064308.
International Search Report and Written Opinion dated Jun. 6, 2019 in Application No. PCT/US2019/018431.
International Search Report and Written Opinion dated Jul. 29, 2019 in Application No. PCT/US2019/32066.
International Search Report and Written Opinion dated Jan. 28, 2020 in Application No. PCT/US2019/057492.
European Search Report dated Jun. 7, 2019 in Application No. 15825979.
European Search Report dated Jan. 28, 2020 in European Application No. 15825979.

(56) References Cited

OTHER PUBLICATIONS

Office Action dated Oct. 31, 2019 in Chinese Application No. 201780033378.3.
Office Action dated Feb. 4, 2020 in Brazilian Application No. 112017021842.9.
Ali et al., "Desiccant Enhanced Nocturnal Radiative Cooling-Solar Collector System for Air Comfort Application in Hot Arid Areas," Int. J. of Thermal & Environmental Engineering, vol. 5, No. 1, pp. 71-82 (2013).
Anand et al., "Solar Cooling Systems for Climate Change Mitigation: A Review," Renewable and Sustainable Energy Reviews, vol. 41, pp. 143-161 (2015).
De Antonellis et al., "Simulation, Performance Analysis and Optimization of Desiccant Wheels," Energy and Buildings, vol. 42, No. 9, pp. 1386-1393 (2010).
Eriksson et al., "Diurnal Variations of Humidity and Ice Water Content in the Tropical Upper Troposphere," Atmos. Chem. Phys. vol. 10, pp. 11519-11533 (2010).
European Solar Thermal Industry Federation (ESTIF), "Key Issues for Renewable Heat in Europe (K4RES-H)," Solar Assisted Cooling—WP3, Task 3.5, Contract EIE/04/204/S07.38607, pp. 1-21 (2006).
Ge et al., "A Mathematical Model for Predicting the Performance of a Compound Desiccant Wheel (A Model of a Compound Desiccant Wheel)," Applied Thermal Engineering, vol. 30, No. 8, pp. 1005-1015 (2010).
Kassem et al., "Solar Powered Dehumidification Systems Using Desert Evaporative Coolers: Review," International Journal of Engineering and Advanced Technology {IJEAT), ISSN: 2249-8958, vol. 3, Issue 1 (2013).
Kolewar et al., "Feasability of Solar Desiccant Evaporative Cooling: A Review," International Journal of Scientific & Engineering Research, ISSN: 2229-5518, vol. 5, Issue 10 (2014).
La et al., "Technical Development of Rotary Desiccant Dehumidification and Air Conditioning: A Review," Renewable and Sustainable Energy Reviews, vol. 14, pp. 130-147 (2010).
Nia et al., "Modeling and Simulation of Desiccant Wheel for Air Conditioning," Energy and Buildings, vol. 38, No. 10, pp. 1230-1239 (2006).
Kozubal et al.,"Desiccant Enhanced Evaporative Air-Conditioning {DEVap): Evaluation of a New Concept in Ultra Efficient Air Conditioning," National Renewal Energy Laboratory {NREL), Technical Report, NREL/TP-5500-49722 (2011).
Critoph et al., "Solar Energy for Cooling and Refrigeration," Engineering Department, University of Warwick, Coventry CV4 7AL, United Kingdom (1997).
Wahlgren, "Atmospheric Water Vapour Processor Designs for Potable Water Production: A Review," Wat. Res., vol. 35, No. 1, pp. 1-22 (2001).
Gad et al., "Application of a Solar Desiccant/Collector System for Water Recovery From Atmospheric Air," Renewal Energy, vol. 22, No. 4, pp. 541-556 (2001).
William et al., "Desiccant System for Water Production From Humid Air Using Solar Energy," Energy, vol. 90, pp. 1707-1720 (2015).
Final Office Action dated Apr. 13, 2021 in U.S. Appl. No. 16/167,295.
Non-Final Office Action dated Apr. 30, 2021 in U.S. Appl. No. 16/278,608.
International Search Report and Written Opinion dated Apr. 6, 2021 in Application No. PCT/US2021/015106.
Office Action dated Apr. 6, 2021 in Chinese Application No. 201780033378.3.
Office Action dated Apr. 28, 2021 in India Patent Application No. 20181704169.
Office Action dated May 18, 2021 in Philippines Application No. 1/2020/500092.
Notice of Allowance dated Oct. 20, 2021 in U.S. Appl. No. 16/820,587.
Notice of Allowance dated Nov. 10, 2021 in U.S. Appl. No. 16/211,896.
Final Office Action dated Dec. 20, 2021 in U.S. Appl. No. 16/791,895.
Office Action dated Nov. 1, 2021 in Chinese Application No. 201780033378.3.
Office Action dated Oct. 20, 2021 in Chinese Patent Application No. 201780044144.9.
Final Office Action dated Oct. 15, 2020 in U.S. Appl. No. 16/791,895.

\* cited by examiner

1000

1002
Heat a regeneration fluid in a regeneration fluid pathway

1004
Move a zone of a continuous desiccant unit between ambient air and the regeneration fluid in the regeneration fluid pathway

1006
Input ambient air to a first batch desiccant unit during a first batch load time

1008
Input at least a portion of the regeneration fluid to the first batch desiccant unit during a first batch release time

1010
Output a batch output fluid from the first batch desiccant unit to a first batch output fluid conduit during the first batch release time

1012
Forming a low pressure condition in the batch output fluid conduit

1014
Condense water vapor from regeneration fluid in the regeneration fluid pathway and the batch output fluid conduit

1016
Maximize liquid water production rate

FIG. 10

SYSTEMS AND METHODS TO PRODUCE LIQUID WATER EXTRACTED FROM AIR

CROSS-REFERENCE TO RELATED APPLICATIONS

This application is a U.S. national phase filing under 35 U.S.C. § 371 of PCT/US2018/049398 filed on Sep. 4, 2018 entitled "SYSTEMS AND METHODS TO PRODUCE LIQUID WATER EXTRACTED FROM AIR," which claims priority to U.S. Provisional Patent Application No. 62/554,231 filed on Sep. 5, 2017, the entireties of which are incorporated herein by reference.

TECHNICAL FIELD

The present disclosure is related to techniques for producing liquid water from ambient air.

BACKGROUND

Producing liquid water by extracting water vapor from ambient air or atmospheric air can present various challenges. Certain challenges include those associated with maximizing a water production rate and/or efficiency at a low cost and high reliability. There exists a need for improved systems and methods for producing liquid water from ambient air or atmospheric air using an inexpensive and reliable approach that maximizes the water production rate and/or efficiency.

BRIEF DESCRIPTION OF THE DRAWINGS

To facilitate further description of the embodiments, the following drawings are provided in which:

FIG. 10 depicts a method to extract water from air, according to an embodiment;

Figure 1:
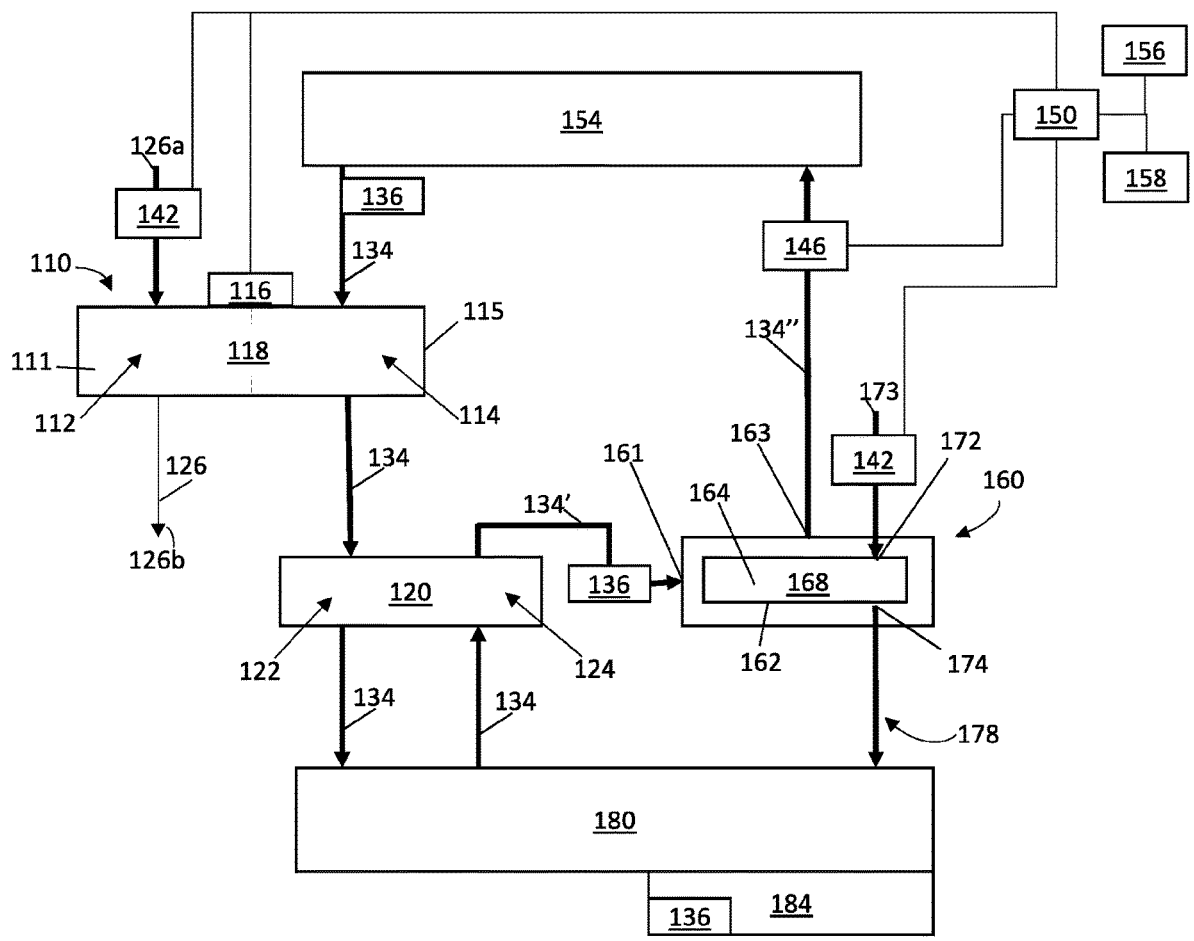
FIG. 1 depicts a system to extract water from air, according to an embodiment.

For simplicity and clarity of illustration, the drawing figures illustrate the general manner of construction, and descriptions and details of well-known features and techniques can be omitted to avoid unnecessarily obscuring the invention. Additionally, elements in the drawing figures are not necessarily drawn to scale. For example, the dimensions of some of the elements in the figures can be exaggerated relative to other elements to help improve understanding of embodiments of the present invention. Identical reference numbers do not necessarily indicate an identical structure.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but can include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements can be electrically coupled together, but not be mechanically or otherwise coupled together; two or more mechanical elements can be mechanically coupled together, but not be electrically or otherwise coupled together; two or more electrical elements can be mechanically coupled together, but not be electrically or otherwise coupled together. Coupling can be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION

In accordance with certain embodiments, a system is disclosed for extracting water from ambient air, the system comprising: a regeneration fluid pathway configured to receive a regeneration fluid; a thermal unit configured to receive the regeneration fluid from the regeneration fluid pathway and to heat the regeneration fluid to a first temperature when the regeneration fluid is received in the thermal unit; and a first continuous desiccant unit comprising: an adsorption zone configured to receive the ambient air, the ambient air being at an ambient temperature; and a desorption zone configured to receive the regeneration fluid from the regeneration fluid pathway. The system further includes a first batch desiccant unit comprising: a regeneration inlet configured to receive at least a first portion of the regeneration fluid from the regeneration fluid pathway at a second temperature and during a first release time, the second temperature being lower than the first temperature; and a batch desiccant housing defining a batch desiccant volume, the batch desiccant housing comprising: a batch desiccant inlet configured to input the ambient air to the batch desiccant volume during a first load time; a batch desiccant outlet configured to output a batch output fluid from the batch desiccant volume to a batch output fluid conduit during the first release time; and a batch desiccant material retained within the batch desiccant volume. The system further comprises a first condenser unit configured to produce liquid water from the regeneration fluid, wherein the system is configured to maximize a water production rate of the first condenser unit based on an amount of heat carried by the regeneration fluid in the regeneration pathway.

In accordance with certain embodiments, a system is disclosed that is operable to extract water from ambient air. The system comprises: a regeneration fluid pathway configured to receive a regeneration fluid; a thermal unit configured to receive the regeneration fluid from the regeneration fluid pathway and to heat the regeneration fluid when the regeneration fluid is received in the thermal unit; and a continuous desiccant unit comprising: an adsorption zone configured to receive the ambient air, the ambient air being at an ambient temperature; and a desorption zone configured to receive the regeneration fluid from the regeneration fluid pathway. The system further comprises multiple batch desiccant units, wherein each of the multiple batch desiccant units includes: a regeneration inlet configured to receive at least a portion of the regeneration fluid from the regeneration fluid pathway during a batch release time; and a batch desiccant housing defining a batch desiccant volume, the batch desiccant housing comprising: a batch desiccant inlet configured to input the ambient air to the batch desiccant volume during a batch load time; a batch desiccant outlet configured to output a batch output fluid from the batch desiccant volume to a batch output fluid conduit during the batch release time; and a batch desiccant material retained within the batch desiccant volume. The system further comprises a first condenser unit configured to produce liquid water from the regeneration fluid and the batch output fluid, wherein: the system is configured to maximize a water production rate of the first condenser unit by varying the batch load time and batch release time of the multiple batch desiccant units.

In accordance with certain embodiments, a method is disclosed for extracting water from ambient air comprising: heating, by a thermal unit, a regeneration fluid; moving a zone of a continuous desiccant unit between the ambient air and the regeneration fluid; inputting the ambient air to a first batch desiccant unit during a first batch load time; inputting at least a first portion of the regeneration fluid to the first batch desiccant unit during a first batch release time; outputting a first batch output fluid from the first batch desiccant unit to a first batch output fluid conduit during the first batch release time; condensing, by at least one condenser unit, water vapor from the regeneration fluid and the first batch output fluid conduit to produce liquid water from the regeneration fluid; and maximizing a liquid water production rate of the at least one condenser unit.

Producing liquid water by extracting water vapor from ambient air can be challenging in terms of maximizing water production rate and/or efficiency at a low cost and high reliability. As a result, there exists a need for improved systems and methods to produce liquid water by extracting water vapor extracted from ambient air. In particular, the thermal performance including the thermal coefficient of performance (COP) of desiccant-based water from air systems and methods can be improved by integrating the complementary thermodynamics of continuous desiccant units (e.g. rotary desiccants) and batch desiccant units. As described in more detail below, improved systems and methods for maximizing liquid water production from desiccant-based systems can be implemented by making use of low grade thermal energy for highly efficient water production. At any one operating point in a diurnal or thermal cycle, the highest grade heat for regenerating desiccant material can be utilized to produce a maximum amount of liquid water when extracting water vapor from ambient air.

FIG. 1 depicts a system 100 to extract water from air, according to an embodiment. In many embodiments, system 100 can comprise a water generation system or a water extraction system. In some embodiments, system 100 can be configured to function responsively to one or more diurnal variations (e.g., variations in ambient air temperature, variations in ambient air relative humidity, variations in solar insolation, and/or the like). For example, as described in more detail below, system 100 can be configured to control one or more operational parameters (e.g., control and/or controlled variables) based on one or more diurnal variations.

In many embodiments, system 100 can comprise a continuous desiccant unit 110. Continuous desiccant unit 110 can comprise a desiccant 118. In some embodiments, desiccant 118 can comprise a sorption medium. In some embodiments, part or all of desiccant 118 can be selectively (e.g., and/or alternatively) movable between an adsorption zone 112, in which desiccant 118 is in fluid communication with a process air pathway 126 (e.g., a process airflow path for inputting ambient air at 126a and outputting ambient air at 126b) and a desorption zone 114, in which desiccant 118 is in fluid communication with a regeneration fluid in a regeneration fluid pathway 134. In some embodiments, regeneration fluid pathway 134 can comprise one or more conduits forming a closed-loop, such as, for example, with one or more other elements of system 100. For example, regeneration fluid pathway 134 can provide closed-loop flow of the regeneration fluid. In some embodiments, desiccant unit 110 can comprise a desiccant unit housing 115. Further, desiccant unit housing 115 can define adsorption zone 112 and desorption zone 114.

Continuous desiccant unit 110 can operate in a continuous, or non-batch, fashion, such that continuous desiccant unit 110 is configured to absorb water and desorb water substantially simultaneously or simultaneously. For example, system 100 can be configured such that a first portion of desiccant 118 can be disposed within adsorption zone 112 (e.g., such that the first portion of desiccant 118 can capture water from process air in process air pathway 126) and a second portion of desiccant 118 can be disposed (e.g., simultaneously disposed) within desorption zone 114 (e.g., such that the second portion can desorb water into regeneration fluid in regeneration fluid pathway 134). In some embodiments, exemplary regeneration fluids can include, but are not limited to, air (e.g., including any suitable amount of water vapor), super-saturated or high relative humidity gas (e.g., 90-100% relative humidity) and/or the like.

Figure 12:
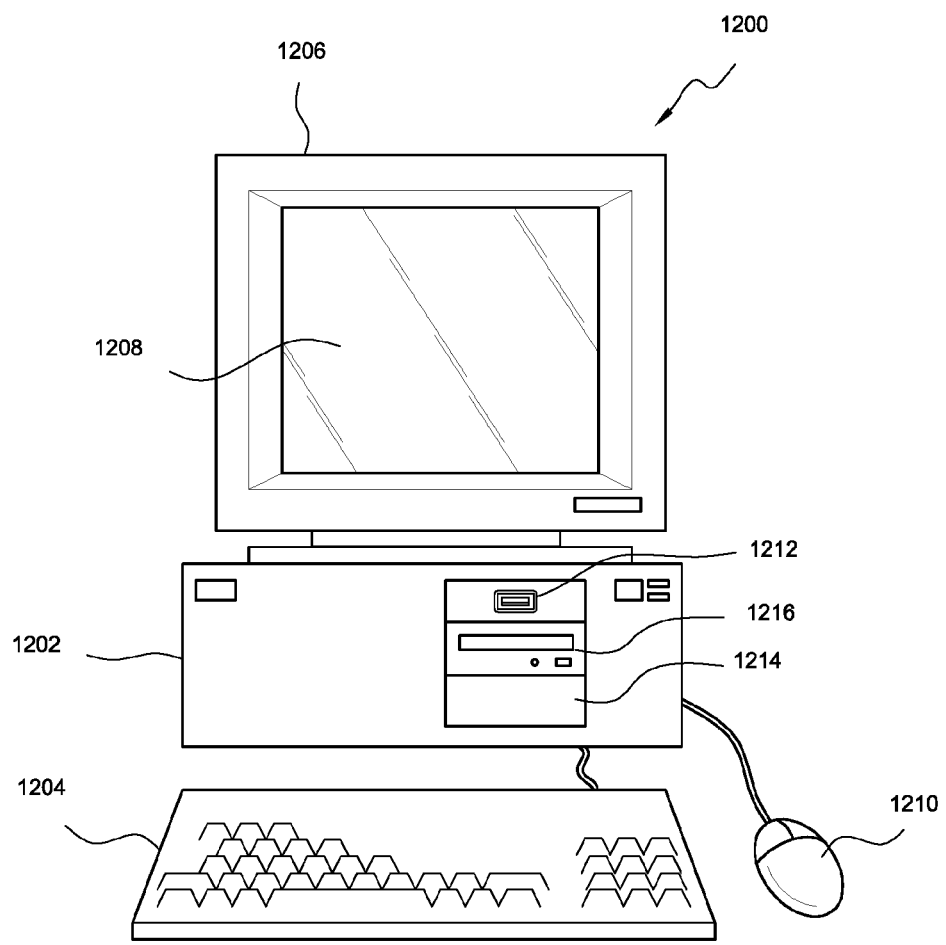
FIG. 12 illustrates a front elevational view of an exemplary computer system that is suitable to implement at least part of the techniques, methods, and systems described herein.

Continuous desiccant unit 110 can comprise a rotatable desiccant disk 111. In some embodiments, desiccant 118 can be disposed on rotatable desiccant disk 111. Further, part or all of desiccant 118 can be configured to move between adsorption zone 112 and desorption zone 114 as rotatable desiccant disk 111 is rotated. For example, a first portion of desiccant 118 can be in communication with process air pathway 126 (e.g., at adsorpotion zone 112), and a second portion of desiccant 118 can be in communication with regeneration fluid pathway 134 (e.g., at desorption zone 114). System 100 can comprise an actuator 116 configured to cause rotation of rotatable desiccant disk 111. For example, actuator 116 can comprise an electric motor. Further system 100 can comprise a controller 150. Controller 150 can be configured to optimize liquid water production of system 100 at least by controlling movement (e.g., through control of actuator 116) of desiccant 118 (e.g., on rotatable desiccant disk 111) between adsorption zone 112 and desorption zone 114. In other embodiments, actuator 116 can rotate one or more portions of continuous desiccant unit 110 (e.g. rotatable desiccant disk 111) at a predetermined rotation rate. In some embodiments, controller 150 can be similar or identical to computer system 1200 (FIG. 12).

In some embodiments, desiccant 118 can be capable of quickly desorbing water back into low relative humidity air (e.g., to regenerate desiccant 118). For example, in some embodiments, desiccant 118 can comprise a hygroscopic material. Therefore, in some embodiments, a performance of desiccant 118 can be driven by an ability to quickly cycle through an absorption state and a desorption state.

System 100 further can comprise a batch desiccant unit 160. Batch desiccant unit 160 can comprise a batch desiccant housing 162 defining a batch desiccant volume 164. Batch desiccant unit 160 can comprise a desiccant 168. Desiccant 168 can comprise a sorption medium. In some embodiments, desiccant 168 can be referred to as a batch or bulk desiccant material. In many embodiments, desiccant 168 can be retained within the batch desiccant volume 164. For example, desiccant particles can be packed in batch desiccant volume 164 to maximize a surface area for interaction with air or other fluid. In some embodiments, the desiccant particles can be agglomerated via a binder. In some embodiments, the desiccant particles can be dyed black (e.g., to improve absorption of thermal radiation). In some embodiments, the desiccant particles can be mixed and/or combined with thermal radiation absorbing materials.

Batch desiccant housing 162 can comprise a batch desiccant inlet 172. Batch desiccant inlet 172 can input ambient air to batch desiccant volume 164 (e.g. process air from a process air pathway 173). As described in more detail below, batch desiccant inlet 172 can input ambient air to the batch desiccant volume 164 during a batch load time. For example, batch desiccant inlet 172 can comprise one or more flow management devices (e.g., a valve) configured such that ambient air enters batch desiccant volume 164 during a batch load time and is sealed or otherwise closed at times other than the batch load time. In some embodiments, the flow management device(s) can be controlled by controller 150. In FIG. 1, process air pathway 126 and process air pathway 173 are depicted separately, however in other embodiments, one or more continuous desiccant units and one or more batch desiccant units can share process air pathway 126 or process air pathway 173. In some of these embodiments, one of process air pathway 126 and process air pathway 173 can be omitted.

Batch desiccant housing 162 further can comprise a batch desiccant outlet 174 for outputting a batch output fluid comprising water vapor from batch desiccant volume 164 to a batch output conduit 178. As described in more detail below, the batch desiccant outlet 174 can be configured to output batch output fluid from the batch desiccant volume 164 to batch output conduit 178 during a batch release time. For example, batch desiccant outlet 174 can comprise one or more flow management devices (e.g., a valve) configured such that batch output fluid leaves or evacuates from batch desiccant volume 164 during a batch release time and is sealed or otherwise closed at times other than the batch release time. In some embodiments, the flow management device(s) can be controlled by controller 150.

Batch desiccant unit 160 can comprise a regeneration inlet 161 configured to input at least a portion of the regeneration fluid from the regeneration fluid pathway 134 to batch desiccant unit 160. Batch desiccant unit 160 can further comprise a regeneration outlet 163 for outputting at least a portion of the regeneration fluid from batch desiccant unit 160 to the regeneration fluid pathway 134. As described in more detail below, the regeneration fluid can enter batch desiccant unit 160 via regeneration inlet 161 during a batch release time. As described in more detail below, regeneration inlet 161 can be configured to permit at least a portion of regeneration fluid into batch desiccant unit 160 so as to heat batch desiccant unit 160 during a batch release time. Meanwhile, regeneration outlet 163 can be configured to permit the regeneration fluid input to batch desiccant unit 160 to be output to regeneration fluid pathway 134 during the batch release time. For example, regeneration inlet 161 can comprise one or more flow management devices (e.g., a valve) configured such that regeneration fluid enters batch desiccant unit 160 during a batch release time and is sealed or otherwise redirected at times other than the batch release time. Further, regeneration outlet 163 can comprise one or more flow management devices (e.g., a valve) configured such that regeneration fluid is output from batch desiccant unit 160 during the batch release time and is sealed or otherwise redirected at times other than the batch release time.

In many embodiments, system 100 can be configured such that the regeneration fluid (e.g. in regeneration fluid pathway at 134') enters batch desiccant unit 160 at a batch inlet temperature that is lower than a temperature of the regeneration fluid at other locations along the regeneration fluid pathway 134 except at locations subsequent to batch desiccant unit 160 (e.g., in regeneration fluid pathway at 134"). In these or other embodiments, the batch inlet temperature and the temperature of the regeneration fluid at other locations along regeneration fluid pathway 134, including at locations subsequent to batch desiccant unit 160 (e.g., in regeneration fluid pathway 134"), can be greater than the ambient temperature. In further embodiments, the temperature of the regeneration fluid entering regeneration inlet 161 can be less than 30 degrees Celsius (° C.) above the ambient temperature. In further embodiments, the regeneration fluid entering the regeneration inlet 161 of batch desiccant unit 160 can have a heat flow less than 500 Watts (W) (e.g. regeneration fluid flowing at 40 cubic feet per minute and 20 degrees Celsius above ambient temperature can translate to approximately 400 Watts carried by the regeneration fluid flowing in the regeneration fluid pathway).

Desiccant 118 can comprise any suitable medium in any suitable configuration (e.g., such that desiccant 118 is capable of adsorption and desorption of water). In some embodiments, desiccant 118 can be capable of sorption at a first temperature and/or pressure and desorption at a second temperature and/or pressure. Suitable mediums for desiccant 118 can comprise liquids, solids, and/or combinations thereof. In some embodiments, desiccants or sorption mediums can comprise any suitable porous solid impregnated with hygroscopic materials. For example, desiccant 118 can comprise silica, silica gel, alumina, alumina gel, montmorillonite clay, zeolites, molecular sieves, activated carbon, metal oxides, lithium salts, calcium salts, potassium salts, sodium salts, magnesium salts, phosphoric salts, organic salts, metal salts, glycerin, glycols, hydrophilic polymers, polyols, polypropylene fibers, cellulosic fibers, derivatives thereof, and combinations of thereof. In some embodiments, desiccant 118 can be selected and/or configured to avoid sorption of certain molecules (e.g., molecules that can be dangerous or toxic when consumed by a human).

In many embodiments, desiccant 168 can be similar or identical to desiccant 118. In some embodiments, desiccant 118 and desiccant 168 can be selected to have one or more differing properties. For example, desiccant 118 can have a lower density than desiccant 168.

System 100 can include blowers 142 and/or a circulator 146. For example, in this embodiment, blowers 142 can be disposed in process air pathway 126 and process air pathway 173 and can be configured to adjust a flow rate of ambient air through the process air pathway. In some embodiments, as shown at FIG. 1, continuous desiccant unit 110 and batch desiccant unit 160 each can have a distinct process air pathway (e.g., process air pathway 126 and process air pathway 173, respectively). However, in other embodiments, one or more continuous desiccant units and one or more batch desiccant units can share one of process air pathway 126 or process air pathway 173. In these embodiments, one of process air pathway 126 and process air pathway 173 can be omitted. Further, in these embodiments, one of blowers 142 can be omitted.

In some embodiments, circulator 146 can be disposed in regeneration fluid pathway 134 and can be configured to adjust a flow rate of regeneration fluid through regeneration fluid pathway 134. In some embodiments, blowers 142 and/or circulator 146 can be controlled by controller 150, such as, for example, to optimize liquid water production of system 100. For example, controller 150 can control speeds of blowers 142 and/or circulator 146. In some embodiments, controller 150 and blowers 142 can be configured to substantially maintain predetermined flow rates through process air pathway 126 and process air pathway 173. In some embodiments, controller 150 and blowers 142 can be configured to substantially maintain a predetermined flow rate through regeneration fluid pathway 134. In some embodiments, the predetermined flow rates through two or more of process air pathway 126, process air pathway 173, and/or regeneration fluid pathway 134 can be similar or the same.

System 100 can comprise a thermal unit 154 configured to provide thermal energy to fluid in regeneration fluid pathway 134 (e.g., such that desiccant 118 and/or desiccant 168 can be regenerated or release captured water). In some embodiments, thermal unit 154 can be a solar thermal unit. For example, thermal unit 154 can be configured to convert solar insolation to thermal energy. While thermal unit 154 can comprise any suitable thermal unit, whether solar or otherwise, in many embodiments, thermal unit 154 can be implemented with a thermal unit as described in International (PCT) Application No. PCT/US2015/061921, filed Nov. 20, 2015, U.S. patent application Ser. No. 15/482,104, filed Apr. 7, 2017, and/or U.S. patent application Ser. No. 15/600,046, filed May 19, 2017, which are hereby incorporated by reference in their entirety.

System 100 can comprise a condenser unit 180 configured to receive regeneration fluid via regeneration fluid pathway 134 and produce liquid water from the received regeneration fluid (e.g., by condensing water vapor in regeneration fluid in regeneration fluid pathway 134). In some embodiments, condenser unit 180 can receive batch output fluid via batch output conduit 178 and produce liquid water from the received batch output fluid (e.g., by condensing water vapor in batch output fluid in batch output conduit 178). For example, batch output fluid exiting the batch desiccant outlet 174 of the batch desiccant volume 164 can be directed to condenser unit 180, such as depicted in FIG. 1. As described in more detail below, batch output fluid in the batch output conduit 178 can enter the condenser unit 180 during a batch release time so as to produce liquid water from the batch output fluid via the batch output fluid conduit 178.

As depicted in FIG. 1, system 100 comprises a single condenser unit 180 to condense both water vapor in regeneration fluid received from regeneration fluid pathway 134 and from continuous desiccant unit 110 and water vapor in batch output fluid received from batch output conduit 178 and from batch desiccant unit 160. However, in other embodiments, a plurality of condenser units can be provided such that one or more continuous desiccant units and one or more batch desiccant units can be associated with a distinct condenser unit. For example, in some embodiments, a first condenser unit can produce liquid water from a continuous desiccant unit and a second condenser unit can produce liquid water from a batch desiccant unit.

A condenser or condenser unit can comprise any suitable material and can be of any suitable configuration (e.g., to condense water vapor in regeneration fluid into liquid water and/or condense water vapor in batch output conduit into liquid water). For example, suitable condensers can comprise polymers, metals, and/or the like. Condensers can be arranged to include coils, fins, plates, tortuous passages, and/or the like. Condenser unit 180 can be configured to transfer thermal energy from fluid in regeneration fluid pathway 134 downstream of desiccant 118 to air in process air pathway 126 and/or process air pathway 173 upstream of desiccant 118 (e.g., such that air in process air pathway 126 and/or process air pathway 173 can facilitate cooling of condenser 180). In some embodiments, condenser unit 180 can be cooled by ambient air.

System 100 can comprise a water collection unit 184 configured to receive liquid water produced by condenser 180. Liquid water produced by the condenser unit 180 can be provided to water collection unit 184 by way of gravity; however, in other embodiments, flow of liquid water from the condenser to the water collection unit can be assisted (e.g., by one or more pumps, any other suitable delivery mechanism, and/or the like).

System 100 can comprise a filter (e.g., a filtration membrane), which can be positioned between condenser 180 and water collection unit 184 (e.g., to reduce an amount of impurities, such as, for example, sand, bacteria, fibrous, carbonaceous species, and/or the like, which can be present in liquid water produced by condenser 180). Water collection unit 184 (e.g., or filter thereof) can comprise an ultraviolet (UV) light source (e.g., for disinfection of liquid water produced by condenser 180). In some embodiments, suitable light sources can comprise light emitting diodes (LEDs)

having, for example: wavelengths below 400 nanometers (nm) (e.g., 385 nm, 365 nm, and/or the like), wavelengths below 300 nm (e.g., 265 nm), and/or the like.

Water collection unit 184 can comprise a receptacle configured to receive one or more additives for introduction to the produced liquid water. Such additives can be configured to dissolve slowly into liquid water stored in the water collection unit. Additives can include, but are not limited to, minerals, salts, other compounds, and/or the like. In some embodiments, additives can impart flavor to the produced liquid water. For example, additives can include potassium salts, magnesium salts, calcium salts, fluoride salts, carbonate salts, iron salts, chloride salts, silica, limestone, and/or combinations thereof.

In some embodiments, system 100 can comprise multiple continuous desiccant units. For example, system 100 can comprise a continuous desiccant unit 120. Continuous desiccant unit 120 can be similar or identical to continuous desiccant unit 110. For example, continuous desiccant unit 120 can comprise an adsorption zone 122 in fluid communication with regeneration fluid in the regeneration fluid pathway 134 exiting condenser unit 180. Continuous desiccant unit 120 further can comprise a desorption zone 124 in fluid communication with the regeneration fluid in regeneration fluid pathway 134 exiting desorption zone 114 of continuous desiccant unit 110.

In some embodiments, at least a portion of the regeneration fluid exiting desorption 124 zone of continuous desiccant unit 120 can be directed to batch desiccant unit 160 during a batch release time. For example, at least a portion of the regeneration fluid in regeneration fluid pathway 114 exiting continuous desiccant unit 120 can be directed to regeneration inlet 161 of batch desiccant unit 160. In other embodiments, such as, for example, when continuous desiccant unit 120 is omitted, at least a portion of the regeneration fluid in regeneration fluid pathway 134 exiting condenser unit 180 can be directed to regeneration inlet 161 of batch desiccant unit 160.

System 100 can comprise controller 150 configured to control production rate of liquid water from air based on one or more operational parameters for water production. Controller 150 can control exposure of desiccant 118 (or a portion thereof) to air in process air pathway 126 and regeneration fluid in regeneration fluid pathway 134 (e.g., to increase, maximize and/or optimize the liquid water ultimately produced by system 100), and such control can vary over a diurnal cycle (e.g., in response to diurnal variations). Furthermore, controller 150 can control exposure of desiccant 168 to air in process air pathway 173 via batch desiccant inlet 172 during a batch load time and can control heating of batch desiccant unit 160 by regeneration fluid in regeneration fluid pathway 134 during a batch release time (e.g., to increase and/or optimize the liquid water ultimately produced), and such control can vary over a diurnal cycle (e.g., in response to diurnal variations). Such variations in environmental conditions (e.g., inputs into controller 150) can include, for example, ambient air temperature, ambient air relative humidity, and solar insolation.

System 100 can comprise a solar power unit 156 configured to provide power to at least a portion of system 100 (e.g., blowers 142, circulator 146, actuator 116, and/or the like). Solar power unit 156 can be configured to convert solar insolation to electrical power (e.g., solar power unit 156 comprises a solar panel). For example, solar power unit 156 can be provided as a photovoltaic solar panel comprising semiconducting materials exhibiting a photovoltaic effect. In these and similar embodiments, controller 150 can be configured to control system 100 in response to diurnal variations in solar insolation (e.g., an amount of electrical power generated by solar power unit 156).

System 100 can comprise a telematics unit 158 (e.g., a transmitter, receiver, transponder, transverter, repeater, transceiver, and/or the like). For example, telematics unit 158 can be configured to communicate operational parameters and/or data to and/or from system 100 (e.g., controller 150) via a wired and/or wireless interface. In on example, wireless communications can conform to standardized communications protocols, such as, for example, global system for mobile communications (GSM), short message service (SMS) components operating at relatively low rates (e.g., operating every few minutes), protocols that can be geographically specified, and/or the like).

Inputs to controller 150 can include, for example, an amount of thermal energy generated by thermal unit 154, an amount of thermal energy of fluid in the regeneration fluid pathway 134 (e.g. at one or more locations along the regeneration fluid pathway 134), a relative humidity of air in process air pathway 126 and/or process air pathway 173, a relative humidity of fluid in regeneration fluid pathway 134 and/or batch output conduit 178, a temperature of fluid in regeneration fluid pathway 134 between continuous desiccant unit 110 and thermal unit 154, a temperature of fluid in regeneration fluid pathway 134" between batch desiccant unit 160 and thermal unit 154, a temperature of batch output fluid in batch output conduit 178 between batch desiccant unit 160 and condenser unit 180, a rate of water production, an amount of water produced, an amount of heat carried by the regeneration fluid in the regeneration pathway (e.g. at one or more locations along the regeneration fluid pathway 134), and/or the like.

Controller 150 can be configured to optimize liquid water production by controlling a rate of movement of desiccant 118 between adsorption zone 112 and desorption zone 114, controlling speeds of blowers 142 and/or circulator 146, controlling exposure of desiccant 168 to ambient air during a batch load time, controlling heating of batch desiccant 168 during a batch release time, controlling evacuation of batch output fluid from batch desiccant volume 164 to batch output conduit 178 during a batch release time, and/or the like, based, on measurements of one or more of such inputs (e.g., such that controller 150 can optimize liquid water production based on current or expected environmental and system conditions).

Controller 150 can be configured to control one or more of blowers 142, circulator 146, actuator 116, batch desiccant inlet 172, batch desiccant outlet 174 and/or the like (e.g., to optimize liquid water production, where such control can be in response to diurnal variations, for example, in ambient temperature, ambient air relative humidity, solar insolation, and/or the like). For example, controller 150 can be configured to increase a rate of liquid water production by controlling blower 142, circulator 146, actuator 116, batch desiccant inlet 172, batch desiccant outlet 174 and/or the like, taking into account, for example, diurnal variations. Such variations can change the amount of thermal energy generated by thermal unit 154, the amount of thermal energy or heat present in regeneration fluid pathway 134, the level of electrical power provided by solar power unit 156, the level of humidity in process or ambient air entering the system, and/or the like. In some embodiments, ambient conditions can be measured in real-time or can be forecast based on, for example, historical averages and/or the like. In embodiments in which controller 150 receives real-time measurements, various sensors (described in more detail below) can provide data indicative of ambient conditions to controller 150 (e.g., continuously, periodically, when requested by controller 150, and/or the like).

System 100 can comprise indicators (e.g., lights, such as, for example, LEDs), which can be configured to provide information regarding operation of system 100. For example, in some embodiments, indicator lights can be configured to provide information (e.g., visually, for example, to a user of system 100) that system 100 is running, that solar power or insolation is available, that an air filter (e.g., within process air pathway 126 and/or process air pathway 173) needs to be changed, that water collection unit 184 is full and/or contains a predetermined volume of liquid water (e.g., 20 liters), that one or more of actuator 116, blowers 142, circulator 146, and/or the like has failed and/or is failing, that telematics errors (e.g., as indicated by telematics unit 158 operation) have and/or are occurring, and/or the like. Any desirable information (including the information described above with reference to indicators) can be transmitted over a communications network (e.g., alone and/or in addition to operation of any indicators).

Controller 150 can operate system 100 based on one or more of: a user selection, data received from one or more sensors, programmatic control, and/or by any other desirable bases. For example, controller 150 can be associated with peripheral devices (including sensors) for sensing data information, data collection components for storing data information, and/or communication components for communicating data information relating to the operation of system 100. In some embodiments, inputs to controller 150 can be measured in that the inputs can be indicated in data captured by one or more sensors. Furthermore, controller 150 can be configured to vary a size of an adsorption zone or a desorption zone (e.g., in response to diurnal variations) of a continuous desiccant unit (e.g., continuous desiccant unit 110, continuous desiccant unit 120, etc.), vary the exposure of a desiccant of a batch desiccant unit (e.g., batch desiccant unit 160) (e.g. via ambient air flow rate, ambient air flow location in batch desiccant volume, etc.) or a combination thereof.

System 100 can comprise one or more peripheral devices, such as sensors 136 (e.g., temperature sensors, humidity sensors, solar insolation sensor, flow rate sensors, water level sensors, and/or the like). In some embodiments, one or more of sensors 136 can provide data indicative of ambient air temperature, ambient air relative humidity, solar insolation, process air temperature, regeneration fluid temperature, process air relative humidity, regeneration fluid relative humidity, process air flow rate, regeneration fluid flow rate, liquid water production rate, water usage rate, and/or the like.

One or more of sensors 136 can be located remotely from other components of system 100 and can provide captured data to the other components of system 100 via a wired and/or wireless connection. For example, a town, village, city, and/or the like can include a plurality of system 100, and one of the plurality of system 100 can provide data indicative of ambient environmental conditions (e.g., air temperature, air relative humidity, a solar insolation level, and/or the like) to another one of the plurality of system 100. In this way, in some embodiments, one or more of sensors 136 can be shared by multiple of the plurality of system 100. In some embodiments, data communicated to controller 150 by one or more peripheral devices (e.g., one or more of sensors 136) can be stored in a data logging unit.

Specific controller, telematics and sensor embodiments and functions are described in greater detail in the co-pending PCT Application No. PCT/US2015/061921, filed Nov. 20, 2015, U.S. patent application Ser. No. 15/600,046, filed May 19, 2017, and U.S. Provisional Patent Application No. 62/554,176, filed Sep. 5, 2017 and which are hereby incorporated herein by reference in their entirety.

System 100 can be modular in nature. For example, system 100 can be configured such that each component of system 100 (e.g. solar power unit 156, thermal unit 154, continuous desiccant unit 110, continuous desiccant unit 120, batch desiccant unit 160, condenser unit 180, water collection unit 184, and/or the like) can be separated from one another, transported, assembled and/or re-assembled with one another (e.g., in a same or a different configuration), and/or the like. For example, in some embodiments, system 100 can be configured such that no dimension of any singular component of system 100 (e.g. solar power unit 156, thermal unit 154, continuous desiccant unit 110, continuous desiccant unit 120, batch desiccant unit 160, condenser unit 180, water collection unit 184, and/or the like) is larger than six to eight feet (e.g., to facilitate transport of system 100 or components thereof, for example, in a single cab truck bed, such as a bed of a Toyota Hilux pickup truck) (e.g., each component has a footprint that is less than or equal to 64 square feet ($ft^2$) and/or each component can be contained within a cubic volume less than or equal to 512 cubic feet ($ft^3$)). Any desirable number of system 100 can be spread across a water management area depending on historical and/or expected ambient conditions within the water management area, building or structures within the water management area, populations within the water management area and so on.

Figure 2:
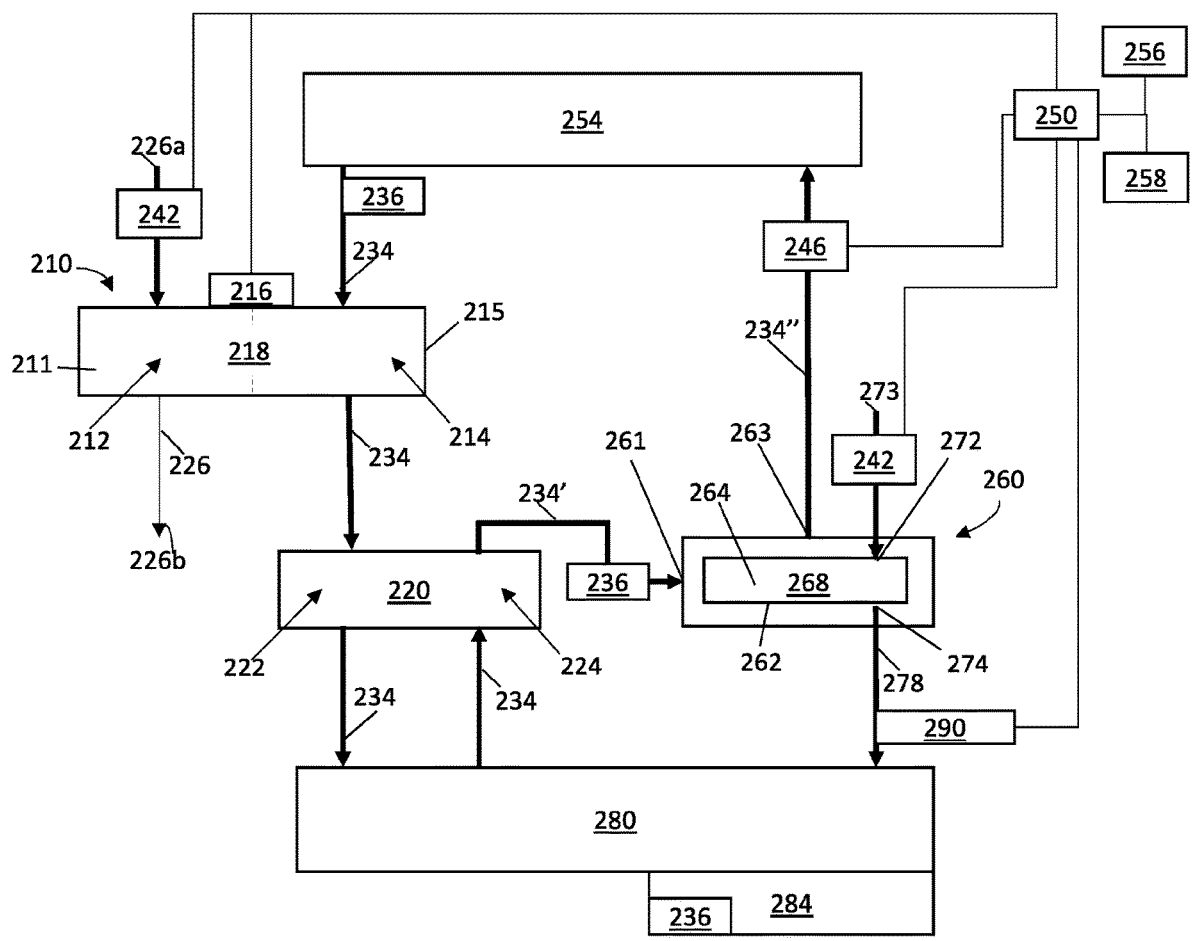
FIG. 2 depicts a system to extract water from air, according to an embodiment.

Turning ahead in the drawings, FIG. 2 depicts a system 200 to extract water from air, according to an embodiment. In some embodiments, system 200 can be similar or identical to system 100 (FIG. 1). However, in some embodiments, system 200 can differ from system 100 (FIG. 1) as described below. Unless otherwise specified, components shown in FIG. 2 assigned reference numbers having the same last two digits as components shown in FIG. 1 above can be similar or identical to those components shown in FIG. 1.

In some embodiments, system 200 can comprise a pump 290 operatively coupled to a batch desiccant volume 264 so as to evacuate gases contained therein and/or establish a low pressure condition in the batch desiccant volume 264. For example, pump 290 can comprise a vacuum pump. In some embodiments, pump 290 can be associated with or connect to a batch output conduit 278 so as to establish a low pressure condition in batch output conduit 278. In some embodiments, a valve at batch desiccant outlet 274 can be actuated or opened so as to establish a low pressure condition in batch output conduit 278 and, in turn, the batch desiccant volume 264. As described in more detail below, in some embodiments, pump 290 can increase a partial pressure of water in batch desiccant volume 264 and/or batch output conduit 278 during a first release time. As a non-limiting example, gases or fluids in batch desiccant volume 264 and/or batch output conduit 278 can have a water vapor pressure greater than 0.1 atmosphere, which can be facilitated by pump 290 operatively coupled to batch output conduit 278.

Figure 3:
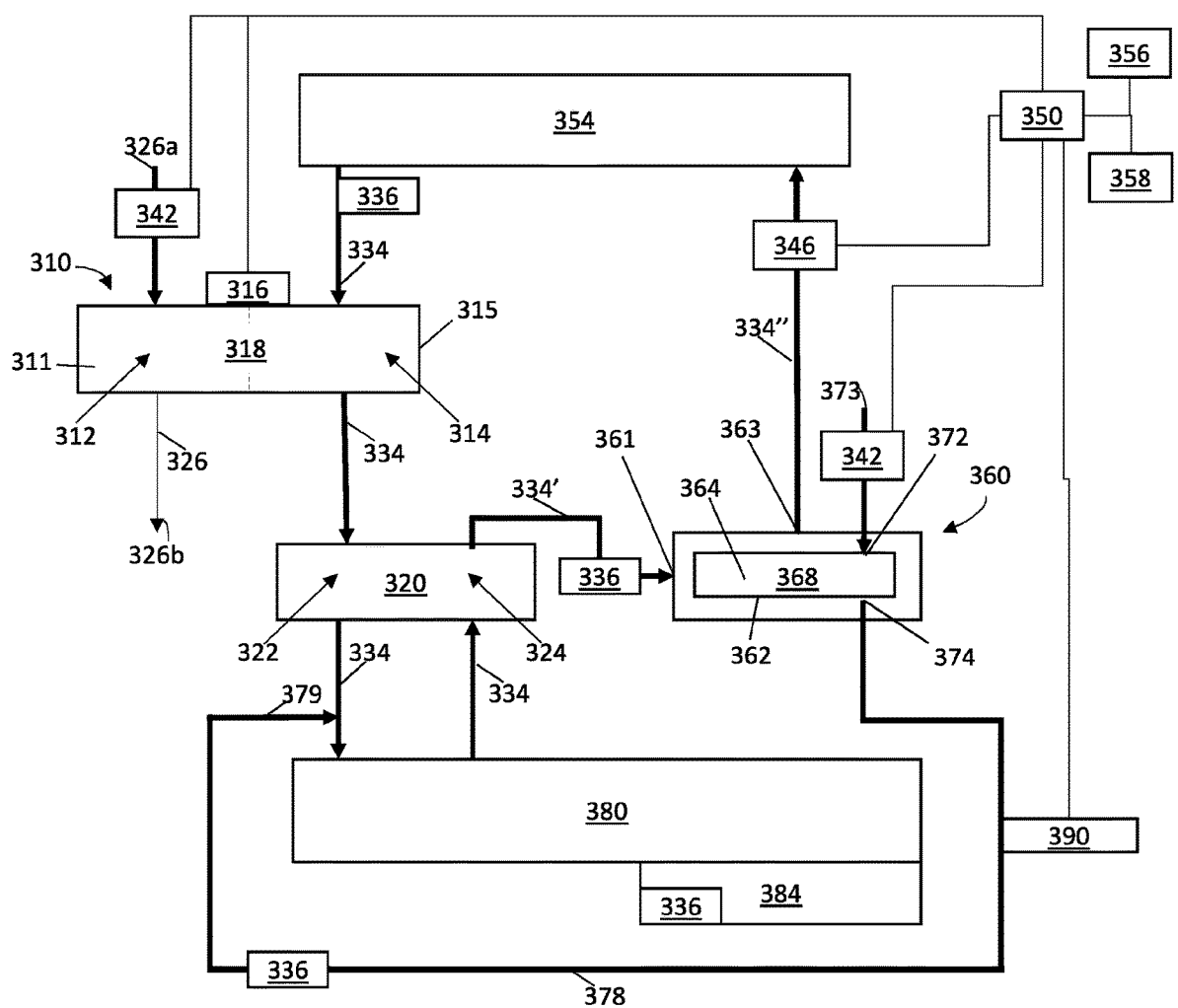
FIG. 3 depicts a system to extract water from air, according to an embodiment.

Turning to the next drawing, FIG. 3 depicts a system 300 to extract water from air, according to an embodiment. In some embodiments, system 300 can be similar or identical to system 100 (FIG. 1) and/or system 200 (FIG. 2). However, in some embodiments, system 200 can differ from system 100 (FIG. 1) and/or system 200 (FIG. 2) as described below. Unless otherwise specified, components shown in FIG. 3 assigned reference numbers having the same last two digits as components shown in FIG. 1 and/or FIG. 2 above can be similar or identical to those components shown in FIG. 1 and/or FIG. 2.

In some embodiments, system 300 comprises a pump 390 operatively coupled to a batch desiccant volume 364 so as to evacuate gases contained therein and/or establish a low pressure condition in batch desiccant volume 364. In some embodiments, at least a portion of batch output fluid exiting batch desiccant outlet 374 can be directed to regeneration fluid pathway 334 via batch output fluid conduit 378. In some embodiments, as depicted in FIG. 3, at least a portion of batch output fluid exiting batch desiccant outlet 374 can be directed to or mixed with regeneration fluid in regeneration fluid pathway 334 at a flow coupling 379 between conduit 378 and regeneration fluid pathway 334 (e.g. T-fitting or mixing valve, for example with adjustable flow control), for example in advance of condenser unit 380. In some embodiments, at least a portion of batch desiccant output fluid in batch output fluid conduit 378 can be directly sent to condenser unit 380 (such as depicted in FIG. 1 and FIG. 2), and at least a portion of the batch output fluid in batch output conduit 378 can be directed to regeneration fluid pathway 334 (such as depicted in FIG. 3) at any one or more desirable locations (e.g. at flow coupling 379) along regeneration fluid pathway 334, and/or a combination thereof.

In some embodiments, one or more of sensors 336 (e.g., temperature sensors, humidity sensors, flow rate sensors, pressure sensor, and/or the like) can be operatively coupled to batch desiccant conduit 378. For example, in some embodiments, one or more of sensors 336 can provide data indicative of batch output fluid temperature, relative humidity, pressure, flow rate, and/or the like. Furthermore, in some embodiments, controller 350 can vary operating parameters of pump 390 in response to sensed conditions, for example sensed conditions of batch output fluid in batch output conduit 376, regeneration fluid in regeneration fluid pathway 334, or a combination thereof.

Figure 4:
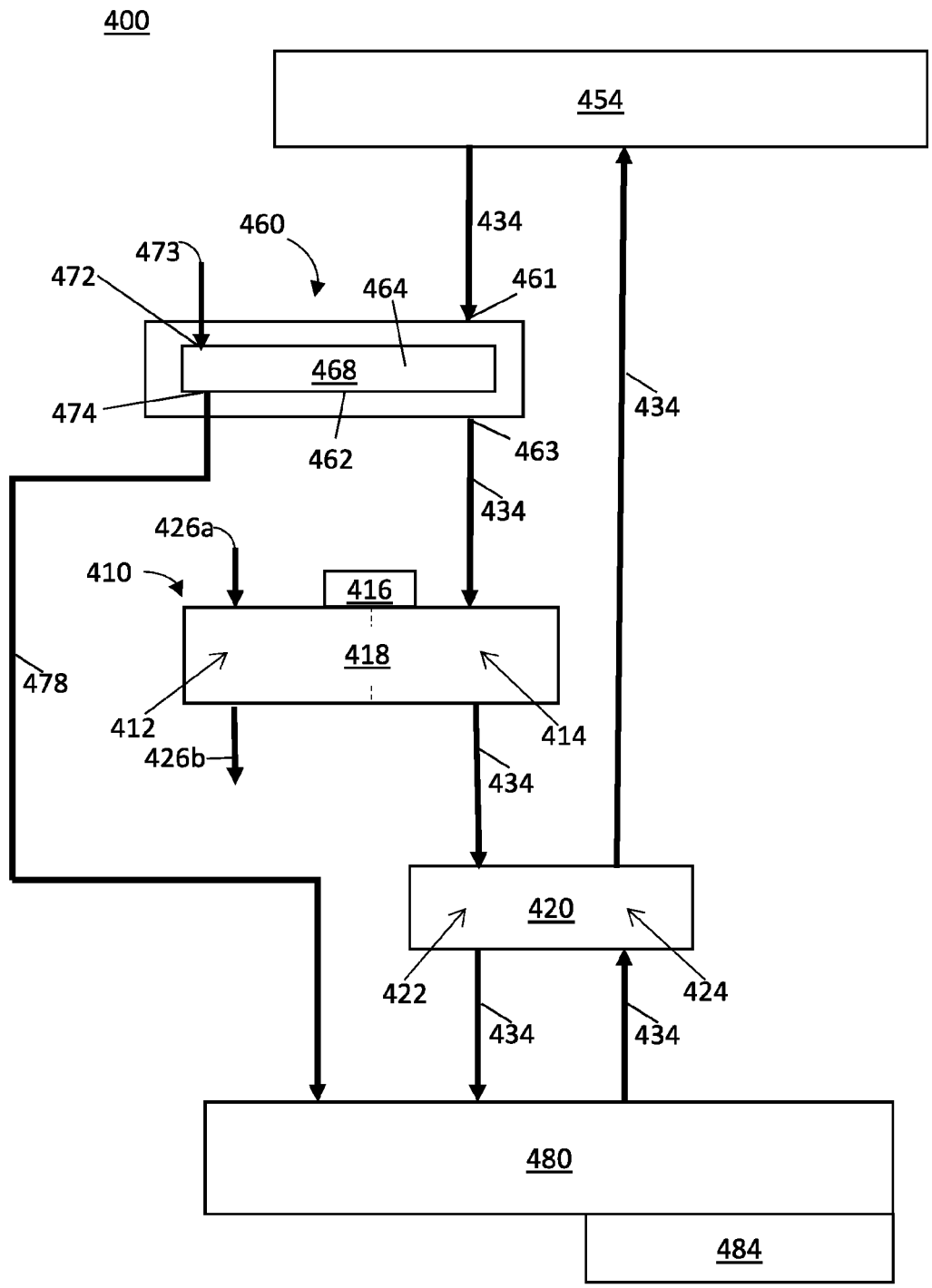
FIG. 4 depicts a system to extract water from air, according to an embodiment.

Turning to the next drawing, FIG. 4 depicts a system 400 to extract water from air, according to an embodiment. In some embodiments, system 400 can be similar or identical to system 100 (FIG. 1), system 200 (FIG. 2), and/or system 300 (FIG. 3). However, in some embodiments, system 400 can differ from system 100 (FIG. 1), system 200 (FIG. 2), and/or system 300 (FIG. 3) as described below. Unless otherwise specified, components shown in FIG. 4 assigned reference numbers having the same last two digits as components shown in FIG. 1, FIG. 2, and/or FIG. 3 above can be similar or identical to those components shown in FIG. 1, FIG. 2, and/or FIG. 3.

In some embodiments, system 400 can comprise a thermal unit 454 configured to provide thermal energy to regeneration fluid in regeneration fluid pathway 434. In some embodiments, at least a portion of a regeneration fluid exiting thermal unit 454 can be directed to a regeneration inlet 461 of a batch desiccant unit 460 during a batch release time. Furthermore, in some embodiments, at least a portion of regeneration fluid can exit batch desiccant unit 460 via a regeneration outlet 463 during a batch release time, such as, for example, to be directed to a desorption zone 414 of a continuous desiccant unit 410.

Figure 5:
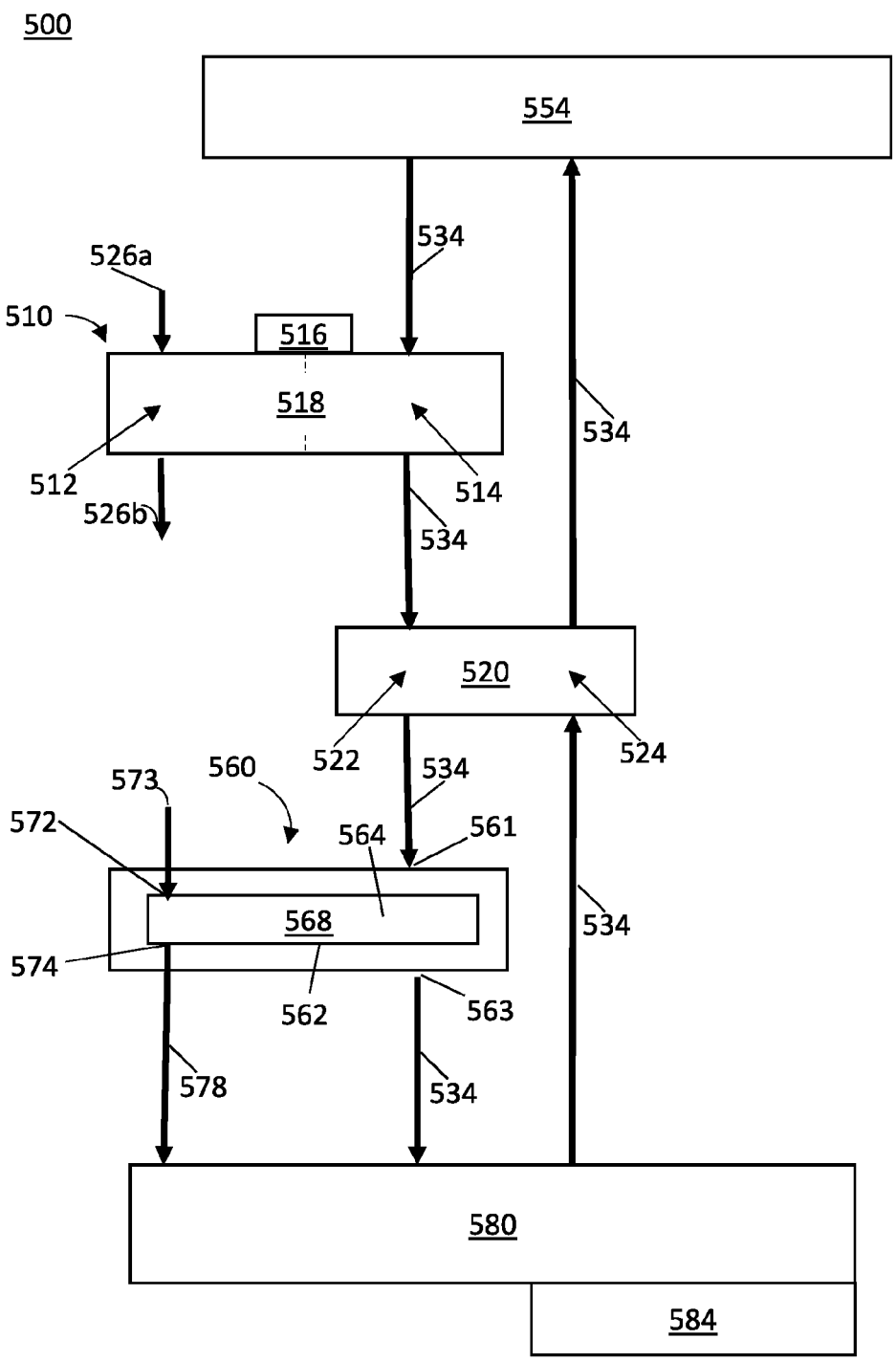
FIG. 5 depicts a system to extract water from air, according to an embodiment.

Turning to the next drawing, FIG. 5 depicts a system 500 to extract water from air, according to an embodiment. In some embodiments, system 500 can be similar or identical to system 100 (FIG. 1), system 200 (FIG. 2), system 300 (FIG. 3), and/or system 400 (FIG. 4). However, in some embodiments, system 500 can differ from system 100 (FIG. 1), system 200 (FIG. 2), system 300 (FIG. 3), and/or system 400 (FIG. 4) as described below. Unless otherwise specified, components shown in FIG. 5 assigned reference numbers having the same last two digits as components shown in FIG. 1, FIG. 2, FIG. 3, and/or FIG. 4 above can be similar or identical to those components shown in FIG. 1, FIG. 2, FIG. 3, and/or FIG. 4.

In some embodiments, system 500 can comprise a continuous desiccant unit 510, a continuous desiccant unit 520, and a batch desiccant unit 560. In some embodiments, at least a portion of regeneration fluid exiting a desorption zone 524 of continuous desiccant unit 510 is directed to a regeneration inlet 561 of batch desiccant unit 560, such as, for example, during a batch release time. As depicted in FIG. 5, in some embodiments, batch desiccant unit 560 comprises a batch output conduit 578 configured to direct at least a portion of batch output fluid directly to condenser 580. However, in other embodiments, at least a portion of batch desiccant output fluid can be directed to regeneration pathway 534 and/or a second condenser unit.

Figure 6:
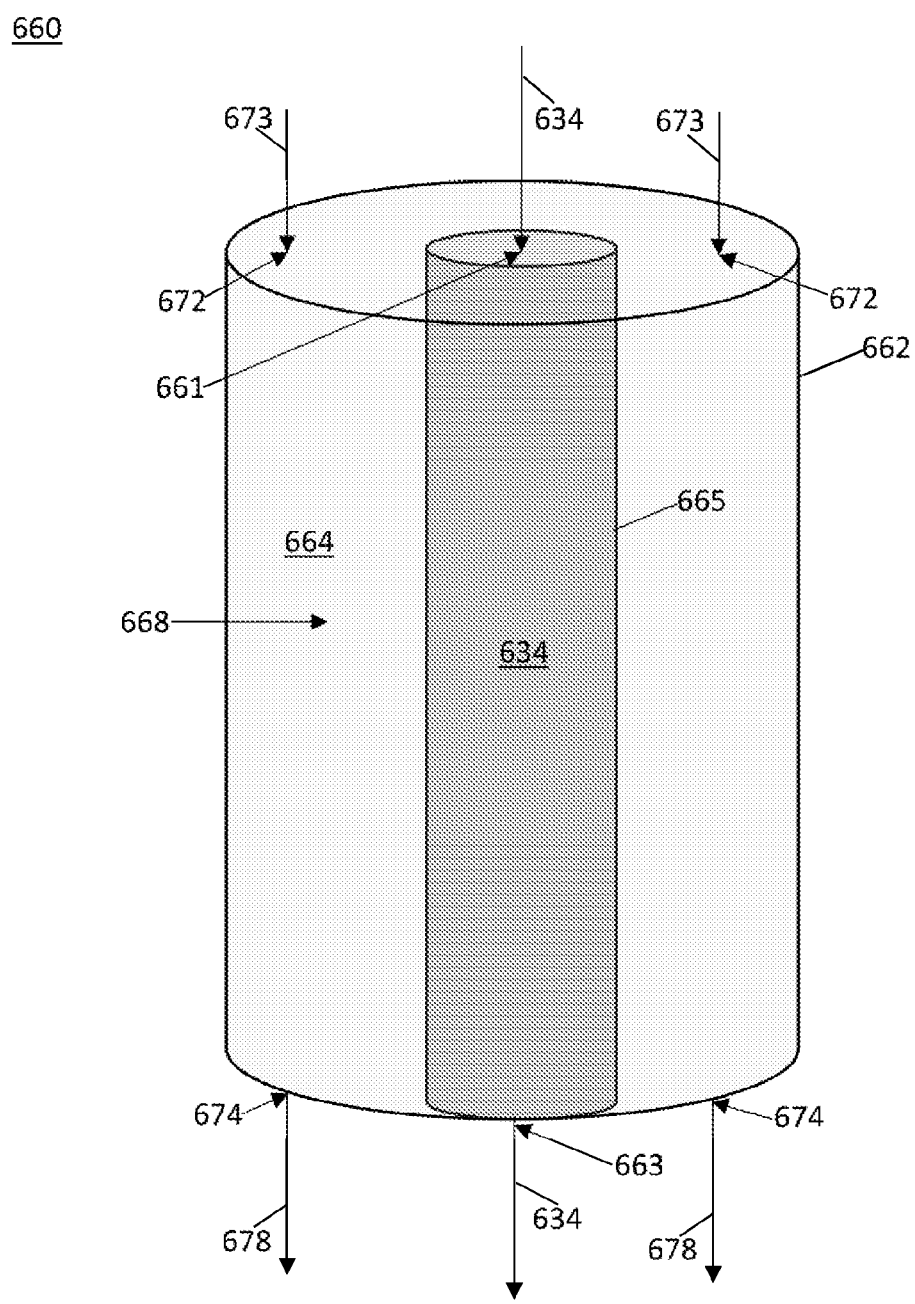
FIG. 6 depicts a batch desiccant unit, according to an embodiment.

Turning to the next drawing, FIG. 6 depicts a batch desiccant unit 660, according to an embodiment. In some embodiments, batch desiccant unit 660 can be similar or identical to batch desiccant unit 160 (FIG. 1), batch desiccant unit 260 (FIG. 2), batch desiccant unit 360 (FIG. 3), batch desiccant unit 460 (FIG. 4), and/or batch desiccant unit 560 (FIG. 5). However, in some embodiments, batch desiccant unit 660 can differ from batch desiccant unit 160 (FIG. 1), batch desiccant unit 260 (FIG. 2), batch desiccant unit 360 (FIG. 3), batch desiccant unit 460 (FIG. 4), and/or batch desiccant unit 560 (FIG. 5) as described below. Unless otherwise specified, components shown in FIG. 6 assigned reference numbers having the same last two digits as components shown in FIG. 1, FIG. 2, FIG. 3, FIG. 4, and/or FIG. 5 above can be similar or identical to those components shown in FIG. 1, FIG. 2, FIG. 3, FIG. 4, and/or FIG. 5.

In some embodiments, batch desiccant unit 660 can comprise a batch desiccant housing 662 defining a batch desiccant volume 664. In some embodiments, desiccant 668 can be retained within batch desiccant volume 664. In some embodiments, batch desiccant housing 662 and batch desiccant volume 664 are depicted in a cylindrical configuration in FIG. 6; however, batch desiccant housing 662 and batch desiccant volume 664 can be provided in any desirable shape or configuration, for example to maximize water uptake and/or release.

In some embodiments, batch desiccant housing 662 can comprise one or more batch desiccant inlets 672 configured to input ambient air to batch desiccant volume 664 (e.g. via process air pathway 673). In some embodiments, batch desiccant inlet(s) 672 can be configured to input ambient air to the batch desiccant volume 664, such as, for example, during a batch load time. In some embodiments, batch desiccant housing 662 further can comprise one or more batch desiccant outlets 674 configured to output a batch output fluid to a batch output conduit 178, such as, for example, during a batch release time.

In some embodiments, batch desiccant unit 660 can comprise a regeneration inlet 661 configured to input at least a portion of the regeneration fluid from regeneration fluid pathway 634 into batch desiccant unit 660. In some embodiments, batch desiccant unit 660 further can comprise a regeneration outlet 663 configured to output at least a portion of the regeneration fluid from batch desiccant unit 660 to regeneration fluid pathway 634. In some embodiments, batch desiccant housing 662 can comprise a heat transfer surface 665 configured to transfer heat carried by the regeneration fluid in regeneration fluid pathway 634 to desiccant 668 in batch desiccant volume 664, such as, for example, during a batch release time.

In some embodiments, batch desiccant volume 664 and regeneration fluid pathway 634 through batch desiccant unit 660 can be provided as distinct volumes, conduits or chambers such that regeneration fluid in regeneration fluid pathway 634 is inhibited from directly interacting with desiccant 668 in batch desiccant volume 664. Furthermore, pressure within batch desiccant volume 664 can be independent from pressure of regeneration fluid pathway 634 through batch desiccant unit 660. During a batch release time, a system comprising a pump can be operatively coupled to batch desiccant volume 664 so as to evacuate gases contained therein and/or establish a low pressure condition in batch desiccant volume 664 and/or batch output conduit 678. For example, the system can be similar or identical to system 200 (FIG. 2) and/or the pump can be similar or identical to pump 290 (FIG. 2). When a low pressure condition is present within batch desiccant volume 664 and/or batch output conduit 678, the pressure of the regeneration fluid in regeneration fluid pathway 634 through batch desiccant unit 660 can be unaffected.

Figure 7:
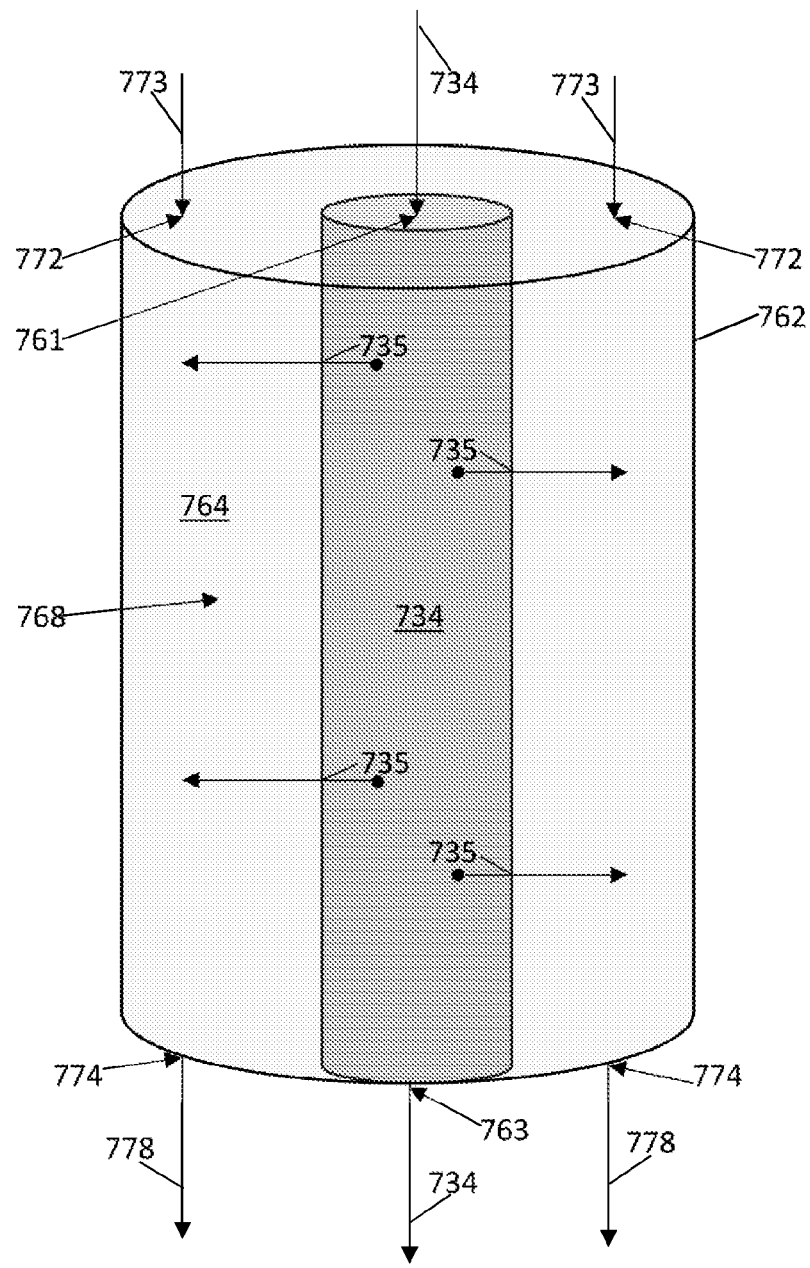
FIG. 7 depicts a batch desiccant unit, according to an embodiment.

Turning to the next drawing, FIG. 7 depicts a batch desiccant unit 760, according to an embodiment. In some embodiments, batch desiccant unit 760 can be similar or identical to batch desiccant unit 160 (FIG. 1), batch desiccant unit 260 (FIG. 2), batch desiccant unit 360 (FIG. 3), batch desiccant unit 460 (FIG. 4), batch desiccant unit 560 (FIG. 5), and/or batch desiccant unit 660 (FIG. 6). However, in some embodiments, batch desiccant unit 660 can differ from batch desiccant unit 160 (FIG. 1), batch desiccant unit 260 (FIG. 2), batch desiccant unit 360 (FIG. 3), batch desiccant unit 460 (FIG. 4), batch desiccant unit 560 (FIG. 5), and/or batch desiccant unit 660 (FIG. 6) as described below. Unless otherwise specified, components shown in FIG. 7 assigned reference numbers having the same last two digits as components shown in FIG. 1, FIG. 2, FIG. 3, FIG. 4, FIG. 5, and/or FIG. 6 above can be similar or identical to those components shown in FIG. 1, FIG. 2, FIG. 3, FIG. 4, FIG. 5, and/or FIG. 6.

In some embodiments, batch desiccant unit 760 can comprise a batch desiccant housing 762 defining batch desiccant volume 764. In some embodiments, batch desiccant housing 762 can comprise one or more openings 735 configured to transfer at least a portion of the regeneration fluid from regeneration fluid pathway 734 into batch desiccant volume 764 so as to heat desiccant 768, such as, for example, during a batch release time. In some embodiments, regeneration fluid from the regeneration fluid pathway 734 can exit batch desiccant volume 764 via batch output conduit 778.

Figure 8:
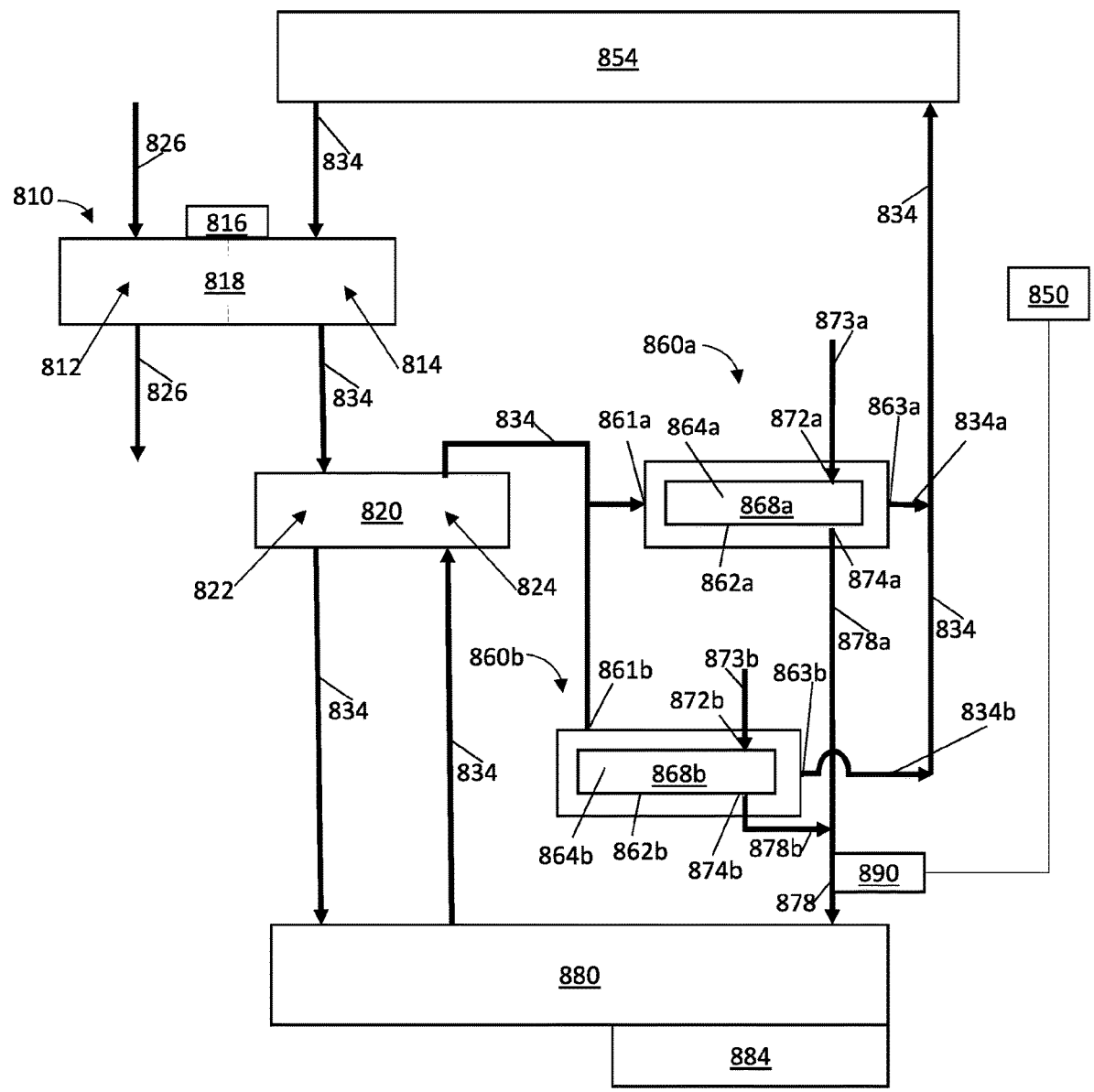
FIG. 8 depicts a system to extract water from air, according to an embodiment.

Turning to the next drawing, FIG. 8 depicts a system 800 to extract water from air, according to an embodiment. In some embodiments, system 800 can be similar or identical to system 100 (FIG. 1), system 200 (FIG. 2), system 300 (FIG. 3), system 400 (FIG. 4), and/or system 500 (FIG. 5). However, in some embodiments, system 800 can differ from system 100 (FIG. 1), system 200 (FIG. 2), system 300 (FIG. 3), system 400 (FIG. 4), and/or system 500 (FIG. 5) as described below. Unless otherwise specified, components shown in FIG. 8 assigned reference numbers having the same last two digits as components shown in FIG. 1, FIG. 2, FIG. 3, FIG. 4, and/or FIG. 5 above can be similar or identical to those components shown in FIG. 1, FIG. 2, FIG. 3, FIG. 4, and/or FIG. 5.

In some embodiments, system 800 can comprise a thermal unit 854 configured to heat a regeneration fluid in a regeneration fluid pathway 834, a continuous desiccant unit 810, a continuous desiccant unit 220, a batch desiccant unit 860a, and a batch desiccant unit 860b. Batch desiccant unit 860a and/or batch desiccant unit 860b can be similar or identical to batch desiccant unit 160 (FIG. 1), batch desiccant unit 260 (FIG. 2), batch desiccant unit 360 (FIG. 3), batch desiccant unit 460 (FIG. 4), batch desiccant unit 560 (FIG. 2), batch desiccant unit 660 (FIG. 6), and/or batch desiccant unit 760 (FIG. 7). In further embodiments, system 800 can comprise one or more additional batch desiccant units, which can be similar or identical to batch desiccant unit 860a and/or batch desiccant unit 860b.

In some embodiments, batch desiccant unit 860a can comprise a regeneration inlet 861a configured to input at least a portion of the regeneration fluid from regeneration fluid pathway 834 into batch desiccant unit 860a and a regeneration fluid outlet 863a configured to output at least a portion of the regeneration fluid from batch desiccant unit 860a into regeneration fluid pathway 834, such as, for example, during a first batch release time. Further, in some embodiments, batch desiccant unit 860b can comprise a regeneration inlet 861b configured to input at least a portion of the regeneration fluid from regeneration fluid pathway 834 into batch desiccant unit 860b and a regeneration fluid outlet 863b configured to output at least a portion of the regeneration fluid from batch desiccant unit 860b into regeneration fluid pathway 834, such as, for example, during a second batch release time.

In some embodiments, batch desiccant unit 860a can comprise a batch desiccant housing 862a defining a batch desiccant volume 864a. Batch desiccant housing 862a can comprise a batch desiccant inlet 872a configured to input ambient air to batch desiccant volume 864a via process air pathway 873a, such as, for example, during a first batch load time. Batch desiccant housing 862a further can comprise a batch desiccant outlet 874a configured to output a batch output fluid from batch desiccant volume 864a to a batch output fluid conduit 878a, such as, for example, during a first batch release time. Further, in some embodiments, batch desiccant unit 860b can comprise a batch desiccant housing 862b defining a batch desiccant volume 864b. Batch desiccant housing 862b can comprise a batch desiccant inlet 872b configured to input ambient air to batch desiccant volume 864b via process air pathway 873b, such as, for example, during a second batch load time. Batch desiccant housing 862b further can comprise a batch desiccant outlet 874b configured to output a batch output fluid from batch desiccant volume 864b to a batch output fluid conduit 878b, such as, for example, during a second batch release time.

In some embodiments, system 800 can comprise a condenser unit 880 for producing liquid water from regeneration fluid in regeneration fluid pathway 834 and batch output fluid from batch output fluid conduit 878a and batch output fluid conduit 878b. In some embodiments, a pump 890 can be operatively coupled to batch desiccant volume 864a and batch desiccant volume 864b and/or batch output fluid conduit 878a and batch output fluid conduit 878b so as to evacuate gases contained therein and/or establish a low pressure condition in the batch desiccant volume 864a and batch desiccant volume 864b and/or batch output fluid conduit 878a and batch output fluid conduit 878b. In some embodiments, a valve of batch desiccant outlet 874a can be actuated or opened so as to establish a low pressure condition in batch desiccant volume 864*a* and/or a valve at a flow coupling of batch output fluid conduit 878*a* and regeneration fluid conduit 834*a* can be actuated or opened so as to establish a low pressure condition in batch output conduit 878*a*, such as, for example, during a first batch release time associated with batch desiccant unit 860*a*. Similarly, a valve of batch desiccant outlet 874*b* can be actuated or opened so as to establish a low pressure condition in batch desiccant volume 864*b* and/or a valve at a flow coupling of batch output fluid conduit 878*b* and regeneration fluid conduit 834*b* can be actuated or opened so as to establish a low pressure condition in batch output conduit 878*b*, such as, for example, during a second batch release time associated with batch desiccant unit 860*b*.

Figure 9:
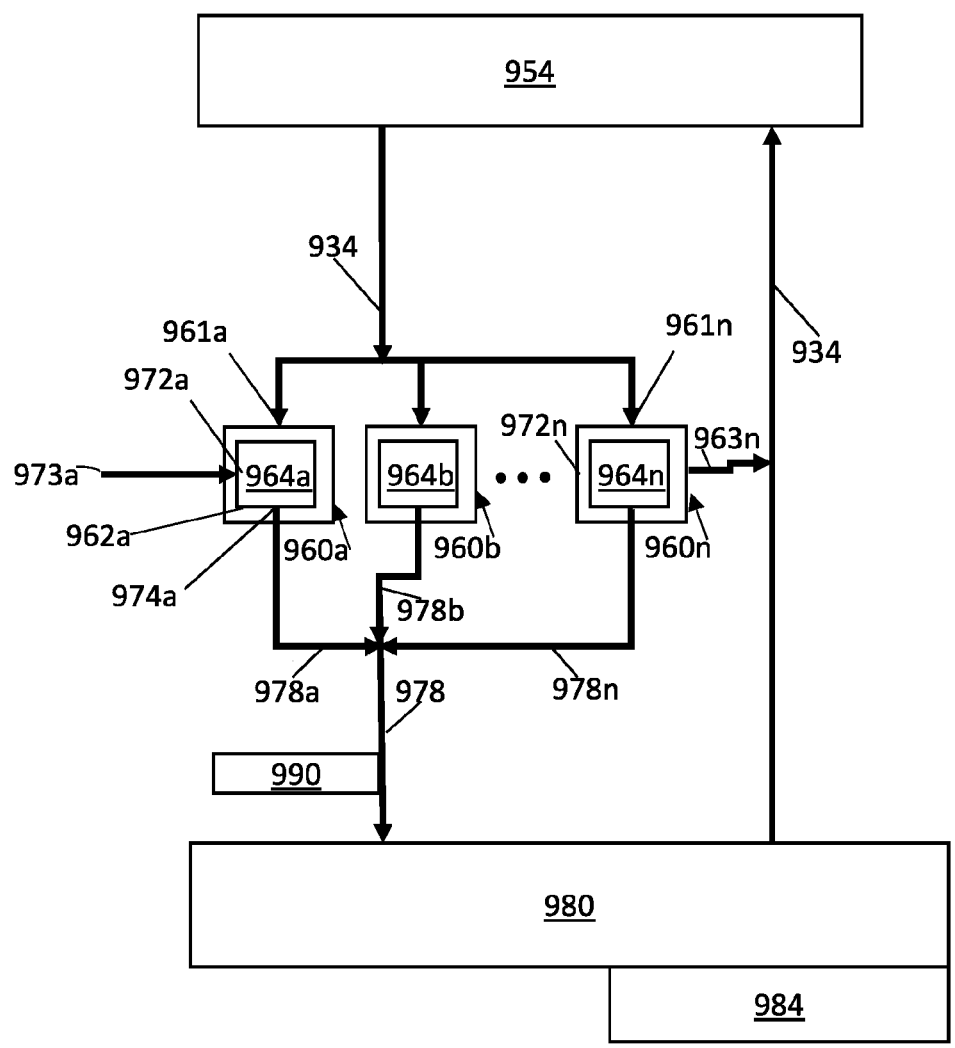
FIG. 9 depicts a system to extract water from air, according to an embodiment.

Turning to the next drawing, FIG. 9 depicts a system 900 to extract water from air, according to an embodiment. In some embodiments, system 900 can be similar or identical to system 100 (FIG. 1), system 200 (FIG. 2), system 300 (FIG. 3), system 400 (FIG. 4), system 500 (FIG. 5), and/or system 800 (FIG. 8). However, in some embodiments, system 900 can differ from system 100 (FIG. 1), system 200 (FIG. 2), system 300 (FIG. 3), system 400 (FIG. 4), system 500 (FIG. 5) and/or system 800 (FIG. 8) as described below. Unless otherwise specified, components shown in FIG. 9 assigned reference numbers having the same last two digits as components shown in FIG. 1, FIG. 2, FIG. 3, FIG. 4, FIG. 5, and/or FIG. 8 above can be similar or identical to those components shown in FIG. 1, FIG. 2, FIG. 3, FIG. 4, FIG. 5, and/or FIG. 8.

In some embodiments, system 900 can comprise a plurality of batch desiccant units (e.g., batch desiccant unit 960*a*, a batch desiccant unit 960*b*, . . . batch desiccant unit 960*n*). Each of the plurality of batch desiccant units can be similar or identical to batch desiccant unit 160 (FIG. 1), batch desiccant unit 260 (FIG. 2), batch desiccant unit 360 (FIG. 3), batch desiccant unit 460 (FIG. 4), batch desiccant unit 560 (FIG. 2), batch desiccant unit 660 (FIG. 6), and/or batch desiccant unit 760 (FIG. 7).

In these or other embodiments, system 900 can comprise one or more continuous desiccant units. The one or more continuous desiccant units are not shown in FIG. 9 for simplicity. Each of the plurality of continuous desiccant units can be similar or identical to continuous desiccant unit 110 (FIG. 1), continuous desiccant unit 210 (FIG. 2), continuous desiccant unit 310 (FIG. 3), continuous desiccant unit 410 (FIG. 4), continuous desiccant unit 510 (FIG. 5), and/or continuous desiccant unit 810 (FIG. 8).

In some embodiments, each of the plurality of batch desiccant units (e.g., batch desiccant unit 960*a*, a batch desiccant unit 960*b*, . . . batch desiccant unit 960*n*) can comprise a batch desiccant housing (e.g., batch desiccant housing 962*a*) which can define a batch desiccant volume (e.g., batch desiccant volume 964*a*, batch desiccant volume 964*b*, batch desiccant volume 964*n*) configured to retain a desiccant. In some embodiments, each batch desiccant housing can be similar or identical to batch desiccant housing 162 (FIG. 1), batch desiccant housing 262 (FIG. 2), batch desiccant housing 362 (FIG. 3), batch desiccant housing 462 (FIG. 4), batch desiccant housing 562 (FIG. 5), batch desiccant housing 662 (FIG. 6), batch desiccant housing 762 (FIG. 7), and/or batch desiccant housing 862 (FIG. 8). In these or other embodiments, each batch desiccant volume can be similar or identical to batch desiccant volume 164 (FIG. 1), batch desiccant volume 264 (FIG. 2), batch desiccant volume 364 (FIG. 3), batch desiccant volume 464 (FIG. 4), batch desiccant volume 564 (FIG. 5), batch desiccant volume 664 (FIG. 6), batch desiccant volume 764 (FIG. 7), and/or batch desiccant volume 864 (FIG. 8). In these or other embodiments, each desiccant can be similar or identical to desiccant 168 (FIG. 1), desiccant 268 (FIG. 2), desiccant 368 (FIG. 3), desiccant 468 (FIG. 4), desiccant 568 (FIG. 5), desiccant 668 (FIG. 6), desiccant 768 (FIG. 7), and/or desiccant 868 (FIG. 8).

In some embodiments, each batch desiccant housing (e.g., batch desiccant housing 962*a*) can comprise a batch desiccant inlet (e.g., batch desiccant inlet 972*a*, . . . batch desiccant inlet 972*n*) configured to input ambient air to its corresponding batch desiccant volume. For example, each batch desiccant inlet can be configured to input ambient air to its corresponding batch desiccant volume during a batch load time associated with its corresponding batch desiccant unit. In some embodiments, each batch desiccant inlet can be similar or identical to batch desiccant inlet 172 (FIG. 1), batch desiccant inlet 272 (FIG. 2), batch desiccant inlet 372 (FIG. 3), batch desiccant inlet 472 (FIG. 4), batch desiccant inlet 572 (FIG. 5), batch desiccant inlet 672 (FIG. 6), batch desiccant inlet 772 (FIG. 7), and/or batch desiccant inlet 872 (FIG. 8).

In some embodiments, each batch desiccant housing (e.g., batch desiccant housing 962*a*) further can comprise a batch desiccant outlet (e.g., batch desiccant outlet 974*a*) configured to output a batch output fluid comprising water vapor to a batch output fluid conduit (e.g., batch output fluid conduit 978*a*, batch output fluid conduit 978*b*, . . . batch output fluid conduit 978*n*). For example, each batch desiccant outlet can be configured to output a batch output fluid to its corresponding batch output fluid conduit during a batch release time associated with its corresponding batch desiccant unit. In some embodiments, each batch desiccant outlet can be similar or identical to batch desiccant outlet 174 (FIG. 1), batch desiccant outlet 274 (FIG. 2), batch desiccant outlet 374 (FIG. 3), batch desiccant outlet 474 (FIG. 4), batch desiccant outlet 574 (FIG. 5), batch desiccant outlet(s) 674 (FIG. 6), batch desiccant outlet(s) 774 (FIG. 7), batch desiccant outlet 874*a* (FIG. 8), and/or batch desiccant outlet 874*b* (FIG. 8). In these or other embodiments, each batch output fluid conduit can be similar or identical to batch output fluid conduit 178 (FIG. 1), batch output fluid conduit 278 (FIG. 2), batch output fluid conduit 378 (FIG. 3), batch output fluid conduit 478 (FIG. 4), batch output fluid conduit 578 (FIG. 5), batch output fluid conduit 678 (FIG. 6), batch output fluid conduit 778 (FIG. 7), and/or batch output fluid conduit 878 (FIG. 8). In some embodiments, as illustrated at FIG. 9, each batch output fluid conduit can be coupled to a primary batch output fluid conduit 978 coupled to a condenser unit 980, but in other embodiments, each batch output fluid conduit can be directly coupled to condenser unit 980. In further embodiments, primary output fluid conduit can be similar or identical to batch output fluid conduit 178 (FIG. 1), batch output fluid conduit 278 (FIG. 2), batch output fluid conduit 378 (FIG. 3), batch output fluid conduit 478 (FIG. 4), batch output fluid conduit 578 (FIG. 5), batch output fluid conduit 678 (FIG. 6), batch output fluid conduit 778 (FIG. 7), and/or batch output fluid conduit 878 (FIG. 8).

In some embodiments, each batch desiccant unit (e.g., batch desiccant unit 960*a*, a batch desiccant unit 960*b*, . . . batch desiccant unit 960*n*) can comprise a regeneration inlet (e.g., regeneration inlet 961*a*, . . . regeneration inlet 961*n*) configured to input at least a portion of the regeneration fluid from regeneration fluid pathway 934 to the corresponding batch desiccant units. In some embodiments, each regeneration inlet can be similar or identical to regeneration inlet 161

(FIG. 1), regeneration inlet 261 (FIG. 2), regeneration inlet 361 (FIG. 3), regeneration inlet 461 (FIG. 4), regeneration inlet 561 (FIG. 5), regeneration inlet 661 (FIG. 6), regeneration inlet 761 (FIG. 7), and/or regeneration inlet 861 (FIG. 8). Further, each batch desiccant unit (e.g., batch desiccant unit 960a, a batch desiccant unit 960b, . . . batch desiccant unit 960n) can comprise a regeneration outlet (e.g., regeneration outlet 963n) configured to output at least a portion of the regeneration fluid from the corresponding batch desiccant units back to regeneration fluid pathway 934. In some embodiments, each regeneration outlet can be similar or identical to regeneration outlet 163 (FIG. 1), regeneration outlet 263 (FIG. 2), regeneration outlet 363 (FIG. 3), regeneration outlet 463 (FIG. 4), regeneration outlet 563 (FIG. 5), regeneration outlet 663 (FIG. 6), regeneration outlet 763 (FIG. 7), and/or regeneration outlet 863 (FIG. 8).

In some embodiments, each batch desiccant unit (e.g., batch desiccant unit 960a, a batch desiccant unit 960b, . . . batch desiccant unit 960n) can comprise a process air pathway (e.g., process air pathway 973a). The process air pathway can be similar or identical to process air pathway 173 (FIG. 1), process air pathway 273 (FIG. 2), process air pathway 373 (FIG. 3), process air pathway 473 (FIG. 4), process air pathway 573 (FIG. 5), process air pathway 673 (FIG. 1), process air pathway 773 (FIG. 7), and/or process air pathway 873 (FIG. 8).

System 900 can be configured such that regeneration fluid can enter one or more of the batch desiccant units via the corresponding batch desiccant inlet(s) during a batch release time associated with the batch desiccant unit(s). Further, system 900 further can comprise a pump 990 operatively coupled to the batch desiccant volumes of the batch desiccant units so as to evacuate gases contained and/or establish a low pressure condition therein. For example, pump 990 can be coupled to the batch output fluid conduits of the batch desiccant units and/or the primary batch output fluid conduit. Each of the batch desiccant outlets (e.g., batch outlet 974a) and/or batch desiccant conduits can comprise a valve that can be actuated or opened so as to establish a low pressure condition in the corresponding batch output fluid conduit and, in turn, the corresponding batch desiccant volume. Pump 990 can increase a partial pressure of water in one or more of the batch desiccant volume(s) and/or batch output conduit(s) during a release time associated with the corresponding batch desiccant unit(s).

The batch desiccant units of system 900 can operate such that one or more batch desiccant units can have a load time at night, early in the day and/or late in the day. Once a solar thermal unit 954 is heating the regeneration fluid and one or more of the batch desiccant units are in a loaded state, a batch release operation associated with one or more of the batch desiccant units can be executed in a cyclic, revolving or "round-robin" manner. For example, during the nighttime, the batch desiccant units can be loaded with water by flowing ambient air (e.g., from the corresponding air process pathway) across each batch desiccant volume (e.g. by actuating valves at the batch desiccant inlets). During the daytime, the regeneration inlet of batch desiccant unit 960a can be configured to permit at least a portion of regeneration fluid into batch desiccant unit 960a so as to heat batch desiccant volume 964a during a batch release time associated with batch desiccant unit 960a. Pump 990 can establish a low pressure condition in batch output conduit 978a during a batch release time associated with batch desiccant unit 960a, such as, for example, by actuating a valve corresponding to batch output conduit 978a. Once a predetermined amount of water (e.g. as determined via a sensor, relative humidity in output conduit, elapsed time, etc.) has been extracted from the batch desiccant unit 960a, this release operation can be repeated for each of the batch desiccant units of the system 900 in a cyclic manner. In particular, pump 990 can establish a low pressure condition in batch output conduit 978b during a batch release time associated with batch desiccant unit 960b, and so on to batch desiccant unit 960n.

In some embodiments, a predetermined first fraction of the water contained within the batch desiccant volume 964a can be extracted, followed by extraction of a first predetermined fraction from batch desiccant unit 960b and so on to batch desiccant unit 960n so as to maximize efficiency of water production of system 900. This "shallow extraction" of water from the batch desiccant units of system 900 in cyclic manner, can optimize the use of heat present in system 900 for maximum water production. Not to be bound by any particular theory, but the water release process at the beginning of a batch release time facilitates the use of low grade heat, whereas higher temperatures can be required to extract water from a batch desiccant unit as less water remains in the batch desiccant volume.

Improved systems and methods for maximizing the extraction of liquid water from air are described herein. As described above, systems to extract liquid water from air can comprise one or more continuous desiccant units and one or more batch desiccant units. Continuous desiccant units can operate in a continuous, or non-batch, fashion, such that water can be absorbed and desorbed by the continuous desiccant unit substantially simultaneously or simultaneously. Batch desiccant units can operate in an intermittent, alternating or batch fashion such that water can be absorbed and desorbed by the batch desiccant unit substantially separately, sequentially or consecutively.

Liquid water produced by extracting water vapor from ambient air can be maximized or optimized by implementing both continuous and batch desiccant units that are regenerated by heat from a thermal unit via regeneration fluid flow. The dynamics of such systems and methods are such that the maximum grade of heat for regenerating desiccant material at any one time can be utilized at any one time to produce a maximum amount of water. Not to be bound by any particular theory, but a system comprising a continuous desiccant unit allows a small desiccant mass to produce water dynamically at high efficiency. However, low grade heat, low temperature heat or waste heat (e.g. regeneration fluid having a low thermal energy or low temperature above ambient air temperature which does not provide a significant temperature swing to regenerate desiccant material in a continuous desiccant unit) flows through the system but can remain wasted or unused in terms of producing liquid water.

Furthermore, thermal performance including the thermal coefficient of performance (COP) of desiccant-based water from air systems can be improved by integrating the complementary thermodynamics of adsorption and desorption in a continuous desiccant unit (e.g. rotary desiccant) and a batch desiccant unit, thereby efficiently using low grade thermal energy for maximum water production.

In some embodiments, regeneration fluid flowing in a regeneration fluid pathway (e.g. regenerative fluid pathway 134' (FIG. 1)) of a system (e.g., system 100 (FIG. 1)) at approximately 40 cubic feet per minute (cfm) and having a temperature of approximately 20 degrees Celsius above ambient air temperature (e.g. regeneration fluid at 45° C. and ambient temperature at 25° C.) can translate to approximately 400 Watts of "low grade" or waste heat, such as, for example, leaving a condenser unit (e.g., condenser unit 180 (FIG. 1)) or a continuous desiccant unit (e.g., continuous desiccant unit 120 (FIG. 1)). A batch desiccant unit of the system (e.g. batch desiccant unit 160 (FIG. 1)) can utilize this 400 Watts of waste heat to heat a desiccant of the batch desiccant unit (e.g. desiccant 168 (FIG. 1)) so as to generate water therefrom. In one example, the batch desiccant unit can have a load time at night, early in the day and/or late in the day when water is not being produced from the continuous desiccant unit and/or solar thermal unit is not heating the regeneration fluid. Once the batch desiccant unit is in a loaded state, the batch release time can occur at a different time of day, for example when a solar thermal unit is producing a high amount of heat in the presence of high solar insolation.

Turning ahead in the drawings, FIG. 10 depicts a method 1000 to extract water from air. Activities of method 1000 that are indicated by dashed lines can be optional in some embodiments. Activities of method 1000 can be performed separately, sequentially or simultaneously. In some embodiments, method 1000 can comprise a method of operating a system. The system can be similar or identical to system 100 (FIG. 1), system 200 (FIG. 2), system 300 (FIG. 3), system 400 (FIG. 4), system 500 (FIG. 5), system 800 (FIG. 8), and/or system 900 (FIG. 9).

In some embodiments, method 1000 can comprise activity 1002 of heating a regeneration fluid in a regeneration fluid pathway, such as, for example, by a solar thermal unit.

In some embodiments, method 1000 can comprise activity 1004 of moving a zone of a continuous desiccant unit between an ambient air flow and the regeneration fluid in the regeneration fluid pathway.

In some embodiments, method 1000 can comprise activity 1006 of inputting ambient or process air to a first batch desiccant unit during a first batch load time. For example, one or more blowers can increase a flow rate of ambient air into a batch desiccant volume of the first batch desiccant unit. In some embodiments, a batch desiccant inlet can comprise a valve (e.g. actuated by a controller) and/or other flow management device to allow ambient air to enter the batch desiccant volume during the first batch load time.

In some embodiments, method 1000 can comprise activity 1008 of inputting at least a portion of the regeneration fluid to the first batch desiccant unit during a first batch release time. A regeneration inlet and regeneration outlet of the batch desiccant unit can permit at least a portion of regeneration fluid to heat desiccant material in the batch desiccant volume during the first batch release time. For example, the regeneration inlet and/or outlet can comprise a valve (e.g. actuated by a controller) and/or other flow management device to facilitate heating.

In some embodiments, method 1000 can comprise activity 1010 of outputting a batch output fluid comprising water vapor from the first batch desiccant unit to a first batch output fluid conduit during the first batch release time. For example, a valve (e.g. actuated by a controller) and/or other flow management device can allow the batch output fluid to exit the batch desiccant volume.

In some embodiments, method 1000 can comprise activity 1012 of forming a low pressure condition in the batch desiccant volume and/or the batch output fluid conduit. For example, a pump can evacuate gases contained in the batch desiccant volume and/or batch output fluid conduit. For example, the pump can increase a partial pressure of water in the batch desiccant volume and/or batch output conduit during the first batch release time. In some embodiments, forming a low pressure condition in the batch desiccant volume and/or batch output fluid conduit occurs during a batch release time. In further embodiments, forming the low pressure condition can comprise forming a pressure below 1 atmosphere in the batch desiccant volume and/or batch output conduit.

In some embodiments, method 1000 further can comprise an activity of determining whether a pressure of gases in the batch desiccant unit and/or batch output fluid conduit is below a predetermined minimum pressure value. In response to determining a pressure of gases in the batch desiccant unit and/or batch output fluid conduit is below a predetermined minimum pressure value, the method can comprise transitioning from outputting batch output fluid from the batch desiccant unit during the batch release time to inputting ambient air to the batch desiccant unit during the batch load time.

In some embodiments, method 1000 can comprise activity 1014 of condensing water vapor contained in the regeneration fluid and/or the batch output fluid conduit. At activity 1014, a first condenser unit can receive the regeneration fluid in the regeneration fluid pathway to produce liquid water from the received regeneration fluid. The first condenser unit or another condenser unit can receive the batch output fluid in the batch output fluid conduit. In some embodiments, ambient or process air can be directed to condenser unit so as to cool the condenser unit.

In some embodiments, method 1000 can comprise activity 1016 of maximizing a liquid water production rate of at least one condenser unit. For example, maximizing the liquid water production rate can comprise altering a rate of moving a zone of a continuous desiccant unit between ambient air and the regeneration fluid in the regeneration fluid pathway. In some embodiments, a rate of moving a zone of the continuous desiccant unit to maximize liquid water production can based on one or more of: an ambient air temperature, ambient air relative humidity, and a level of solar insolation.

In some embodiments, performing activity 1016 can comprise an activity of varying a batch load time and a batch release time of one or more batch desiccant units. For example, exposure of batch desiccant to ambient air during a batch load time and heating of batch desiccant by regeneration fluid in regeneration fluid pathway during a batch release time can be varied over a diurnal cycle (e.g., in response to diurnal variations). Such variations in environmental conditions can include, for example, ambient air temperature, ambient air relative humidity, and solar insolation. In some embodiments, a batch load time can be a time duration corresponding to a nighttime environmental condition. In further embodiments, a batch load time can be a time duration corresponding to a daytime environmental condition. In some embodiments, a batch release time can be a time duration corresponding to a daytime environmental condition.

In various embodiments, current or expected variations in operating parameters of the system (e.g. water produced, amount of heat carried by regeneration fluid, temperature of regeneration fluid, pressure of batch output conduit, relative humidity in batch output conduit, and so on) can be used to determine the extent of variations in the batch load time and batch release time. In some embodiments, such as, for example, where the system comprises at least one sensors, method 1000 can further comprise an activity of sensing a signal received from at least one of the sensors. For example, maximizing the liquid water production rate can comprise commencing the batch release time based on an amount of heat carried by the regeneration fluid in the regeneration fluid pathway (e.g. based on a temperature of the regeneration fluid in the regeneration fluid pathway).

In some embodiments, activity 1016 can be performed continuously or simultaneously with other activities of method 1000 or can be performed at predetermined intervals or as a result of changes in environmental conditions and/or operating conditions.

Figure 11:
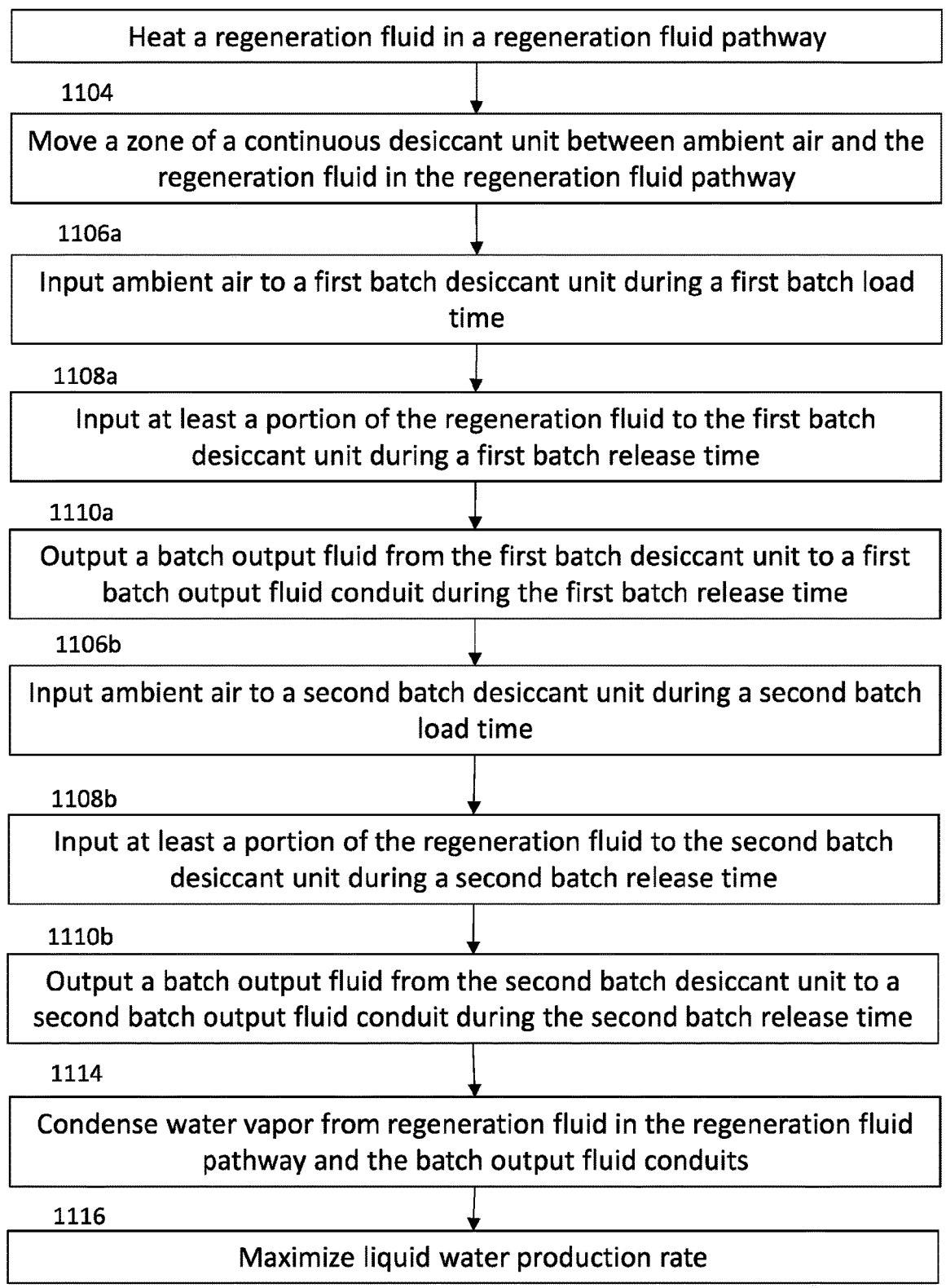
FIG. 11 depicts a method to extract water from air, according to an embodiment.

Turning ahead in the drawings, FIG. 11 depicts a method 1100 to extract water from air. Activities of method 1100 that are indicated by dashed lines can be optional in some embodiments. Activities of method 1100 can be performed separately, sequentially or simultaneously. In some embodiments, method 1100 can be similar or identical to method 1000 (FIG. 10). However, in some embodiments, method 1100 can differ from method 1000 (FIG. 10) as described below. Unless otherwise specified, activities shown in FIG. 11 assigned reference numbers having the same last two digits as activities shown in FIG. 10 above can be similar or identical to those activities shown in FIG. 10. In some embodiments, method 1100 can comprise a method of operating a system. The system can be similar or identical to system 100 (FIG. 1), system 200 (FIG. 2), system 300 (FIG. 3), system 400 (FIG. 4), system 500 (FIG. 5), system 800 (FIG. 8), and/or system 900 (FIG. 9).

In some embodiments, method 1100 can comprise activity 1106a of inputting ambient or process air to a first batch desiccant unit during a first batch load time.

In some embodiments, method 1100 can comprise activity 1108a of inputting at least a portion of the regeneration fluid to the first batch desiccant unit during a first batch release time to heat desiccant material in the first batch desiccant volume during a first batch release time.

In some embodiments, method 1100 can comprise activity 1110a of outputting a first batch output fluid comprising water vapor from the first batch desiccant unit to a first batch output fluid conduit during the first batch release time.

In some embodiments, method 1100 can comprise activity 1106b of inputting ambient or process air to a second batch desiccant unit during a second batch load time.

In some embodiments, method 1100 can comprise activity 1108b of inputting at least a portion of the regeneration fluid to the second batch desiccant unit during a second batch release time to heat desiccant material in the second batch desiccant volume during a second batch release time.

In some embodiments, method 1100 can comprise activity 1110b of outputting a second batch output fluid comprising water vapor from the second batch desiccant unit to a second batch output fluid conduit during the second batch release time.

In some embodiments, performing activity 1116 of method 1100 can comprise varying the first and second batch load times and the first and second batch release times of the batch desiccant units. For example, the second release time can be subsequent to the first release time. In another example, the first release time and the second release time occur in an alternating manner. As yet another example, the first and second release times can be time durations corresponding to a daytime environmental condition.

Turning ahead in the drawings, FIG. 12 illustrates an exemplary embodiment of a computer system 1200, all of which or a portion of which can be suitable for (i) implementing part or all of one or more embodiments of the techniques, methods, and systems and/or (ii) implementing and/or operating part or all of one or more embodiments of the memory storage devices described herein. For example, in some embodiments, all or a portion of computer system 1200 can be suitable for implementing part or all of one or more embodiments of the techniques, methods, and/or systems described herein. Furthermore, one or more elements of computer system 1200 (e.g., a refreshing monitor 1206, a keyboard 1204, and/or a mouse 1210, etc.) also can be appropriate for implementing part or all of one or more embodiments of the techniques, methods, and/or systems described herein.

In many embodiments, computer system 1200 can comprise chassis 1202 containing one or more circuit boards (not shown), a Universal Serial Bus (USB) port 1212, a hard drive 1214, and an optical disc drive 1216. Meanwhile, for example, optical disc drive 1216 can comprise a Compact Disc Read-Only Memory (CD-ROM), a Digital Video Disc (DVD) drive, or a Blu-ray drive. Still, in other embodiments, a different or separate one of a chassis 1202 (and its internal components) can be suitable for implementing part or all of one or more embodiments of the techniques, methods, and/or systems described herein.

Figure 13:
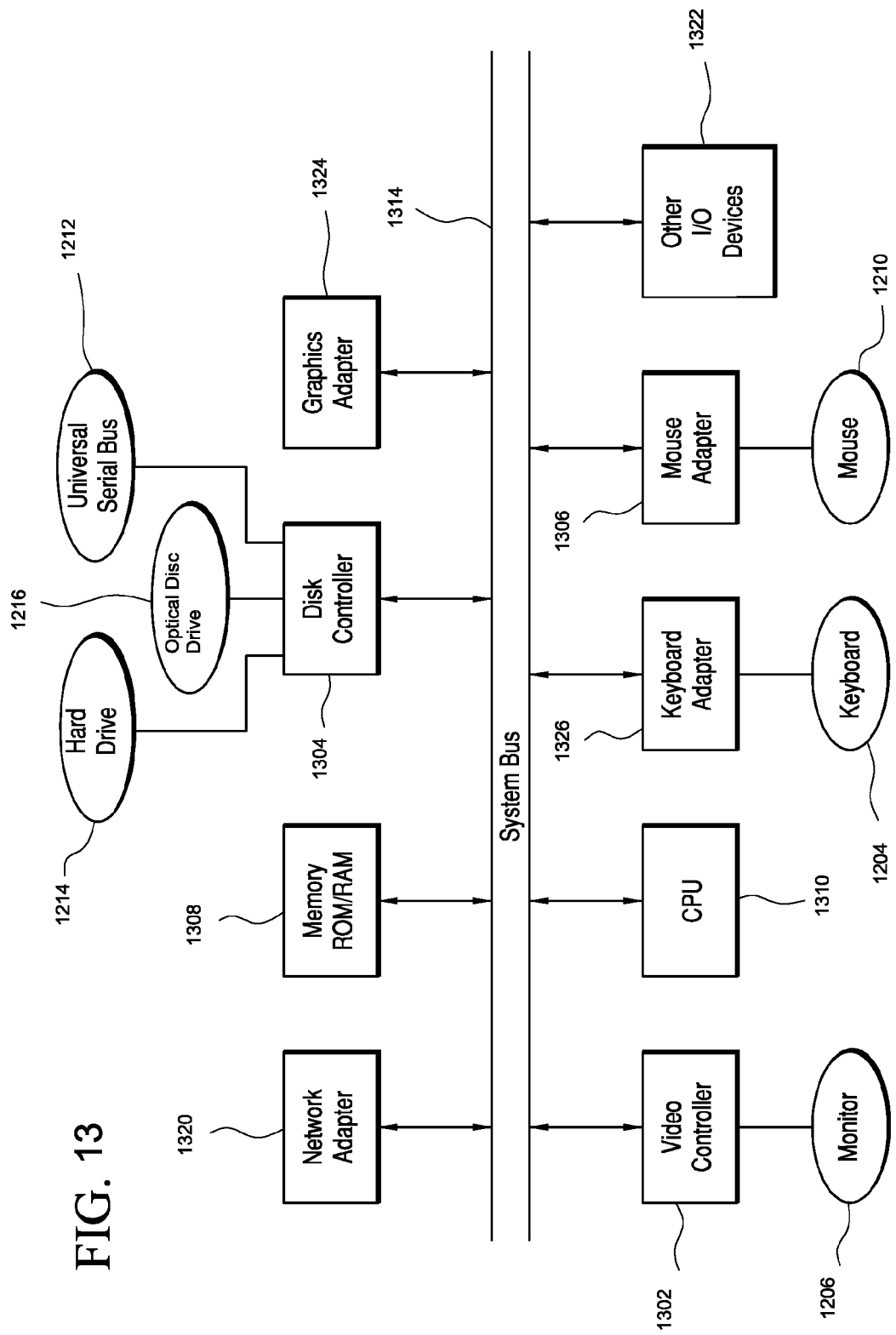
FIG. 13 illustrates a representative block diagram of exemplary elements included on the circuit boards inside a chassis of the computer system of FIG. 12.

Turning ahead in the drawings, FIG. 13 illustrates a representative block diagram of exemplary elements included on the circuit boards inside chassis 1202 (FIG. 13). For example, a central processing unit (CPU) 1310 is coupled to a system bus 1314. In various embodiments, the architecture of CPU 1310 can be compliant with any of a variety of commercially distributed architecture families.

In many embodiments, system bus 1314 also is coupled to a memory storage unit 1308, where memory storage unit 1308 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 1308 can comprise (i) non-transitory memory and/or (ii) transitory memory.

The memory storage device(s) of the various embodiments disclosed herein can comprise memory storage unit 1308, an external memory storage drive (not shown), such as, for example, a USB-equipped electronic memory storage drive coupled to universal serial bus (USB) port 1212 (FIGS. 12 & 13), hard drive 1214 (FIGS. 12 & 13), optical disc drive 1216 (FIGS. 12 & 13), a floppy disk drive (not shown), etc. As used herein, non-volatile and/or non-transitory memory storage device(s) refer to the portions of the memory storage device(s) that are non-volatile and/or non-transitory memory.

In various examples, portions of the memory storage device(s) of the various embodiments disclosed herein (e.g., portions of the non-volatile memory storage device(s)) can be encoded with a boot code sequence suitable for restoring computer system 1200 (FIG. 12) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 1200 (FIG. 12). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) iOS™ by Apple Inc. of Cupertino, Calif., United States of America, (ii) the Blackberry® OS by Research In Motion (RIM) of Waterloo, Ontario, Canada, (iii) the Android™ OS developed by the Open Handset Alliance, or (iv) the Windows Mobile™ OS by Microsoft Corp. of Redmond, Wash., United States of America. Further, as used herein, the term "computer network" can refer to a collection of computers and devices interconnected by communications channels that facilitate communications among users and allow users to share resources (e.g., an internet connection, an Ethernet connection, etc.). The computers and devices can be interconnected according to any conventional network topology (e.g., bus, star, tree, linear, ring, mesh, etc.).

As used herein, the term "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 1310.

In the depicted embodiment of FIG. 13, various I/O devices such as a disk controller 1304, a graphics adapter 1324, a video controller 1302, a keyboard adapter 1326, a mouse adapter 1306, a network adapter 1320, and other I/O devices 1322 can be coupled to system bus 1314. Keyboard adapter 1326 and mouse adapter 1306 are coupled to keyboard 1204 (FIGS. 12 & 13) and mouse 1210 (FIGS. 12 & 13), respectively, of computer system 1200 (FIG. 12). While graphics adapter 1324 and video controller 1302 are indicated as distinct units in FIG. 13, video controller 1302 can be integrated into graphics adapter 1324, or vice versa in other embodiments. Video controller 1302 is suitable for refreshing monitor 1206 (FIGS. 12 & 13) to display images on a screen 1208 (FIG. 12) of computer system 1200 (FIG. 12). Disk controller 1304 can control hard drive 1214 (FIGS. 12 & 13), USB port 1212 (FIGS. 12 & 13), and CD-ROM drive 1216 (FIGS. 12 & 13). In other embodiments, distinct units can be used to control each of these devices separately.

Network adapter 1320 can be suitable to connect computer system 1200 (FIG. 12) to a computer network by wired communication (e.g., a wired network adapter) and/or wireless communication (e.g., a wireless network adapter). In some embodiments, network adapter 1320 can be plugged or coupled to an expansion port (not shown) in computer system 1200 (FIG. 12). In other embodiments, network adapter 1320 can be built into computer system 1200 (FIG. 12). For example, network adapter 1320 can be built into computer system 1200 (FIG. 12) by being integrated into the motherboard chipset (not shown), or implemented via one or more dedicated communication chips (not shown), connected through a PCI (peripheral component interconnector) or a PCI express bus of computer system 1200 (FIG. 12) or USB port 1212 (FIG. 12).

Returning now to FIG. 12, although many other components of computer system 1200 are not shown, such components and their interconnection are well known to those of ordinary skill in the art. Accordingly, further details concerning the construction and composition of computer system 1200 and the circuit boards inside chassis 1202 are not discussed herein.

Meanwhile, when computer system 1200 is running, program instructions (e.g., computer instructions) stored on one or more of the memory storage device(s) of the various embodiments disclosed herein can be executed by CPU 1310 (FIG. 13). At least a portion of the program instructions, stored on these devices, can be suitable for carrying out at least part of the techniques, methods, and activities of the methods described herein. In various embodiments, computer system 1200 can be reprogrammed with one or more systems, applications, and/or databases to convert computer system 1200 from a general purpose computer to a special purpose computer.

Further, although computer system 1200 is illustrated as a desktop computer in FIG. 12, in many examples, system 1200 can have a different form factor while still having functional elements similar to those described for computer system 1200. In some embodiments, computer system 1200 can comprise a single computer, a single server, or a cluster or collection of computers or servers, or a cloud of computers or servers. Typically, a cluster or collection of servers can be used when the demand on computer system 1200 exceeds the reasonable capability of a single server or computer. In certain embodiments, computer system 1200 can comprise an embedded system.

In many embodiments, part or all of one or more embodiments of the techniques, methods, and systems can be implemented with hardware and/or software. In some embodiments, at least part of the hardware and/or software can be conventional, while in these or other embodiments, part or all of the hardware and/or software can be customized (e.g., optimized) for implementing the part or all of the one or more embodiments of the techniques, methods, and systems. When implemented in software (e.g., firmware), the part or all of the one or more embodiments of the techniques, methods, and systems can be stored as one or more instructions or code on a non-transitory computer-readable medium. Examples include non-transitory computer-readable media encoded with a data structure and non-transitory computer-readable media encoded with a computer program. Non-transitory computer-readable media are physical computer storage media. A physical storage medium can be any available medium that can be accessed by a computer. By way of example, and not limitation, such non-transitory computer-readable media can comprise RAM, ROM, EPROM, EEPROM, CD-ROM or other optical disk storage, magnetic disk storage or other magnetic storage devices, or any other physical medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above are also be included within the scope of non-transitory computer-readable media. Moreover, the functions described above can be achieved through dedicated devices rather than software, such as a hardware circuit comprising custom VLSI circuits or gate arrays, off-the-shelf semiconductors such as logic chips, transistors, or other discrete components, all of which are non-transitory. Additional examples include programmable hardware devices such as field programmable gate arrays, programmable array logic, programmable logic devices or the like, all of which are non-transitory. Still further examples include application specific integrated circuits (ASIC) or very large scale integrated (VLSI) circuits. In fact, persons of ordinary skill in the art can utilize any number of suitable structures capable of executing logical operations according to the described embodiments.

Although the invention has been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-13 can be modified, and that the foregoing discussion of certain of these embodiments does not necessarily represent a complete description of all possible embodiments. For example, one or more of the activities of the methods described herein can include different activities and be performed by many different elements, in many different orders. As another example, the elements within one or more of the systems described herein can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A system operable to extract water from ambient air, the system comprising:
  a regeneration fluid pathway configured to receive a regeneration fluid;
  a thermal unit configured to receive the regeneration fluid from the regeneration fluid pathway and to heat the regeneration fluid to a first temperature when the regeneration fluid is received in the thermal unit;
  a first continuous desiccant unit comprising:
    an adsorption zone configured to receive the ambient air, the ambient air being at an ambient temperature; and
    a desorption zone configured to receive the regeneration fluid from the regeneration fluid pathway;
  a first batch desiccant unit comprising:
    a regeneration inlet configured to receive at least a first portion of the regeneration fluid from the regeneration fluid pathway at a second temperature and during a first release time, the second temperature being lower than the first temperature; and
  a batch desiccant housing defining a batch desiccant volume, the batch desiccant housing comprising:
    a batch desiccant inlet configured to input the ambient air to the batch desiccant volume during a first load time;
    a batch desiccant outlet configured to output a batch output fluid from the batch desiccant volume to a batch output fluid conduit during the first release time; and
    a batch desiccant material retained within the batch desiccant volume; and
  at least one condenser unit configured to produce liquid water from the regeneration fluid;
  wherein:
    the system is configured to maximize a water production rate of the at least one condenser unit based on an amount of heat carried by the regeneration fluid in the regeneration pathway.

2. The system according to claim 1, wherein the regeneration inlet of the first batch desiccant unit is configured to receive at least a second portion of the regeneration fluid, and wherein the at least a second portion comprises:
  regeneration fluid exiting the at least one condenser unit during the first release time;
  regeneration fluid exiting the thermal unit during the first release time; or
  regeneration fluid exiting the desorption zone of the first continuous desiccant unit during the first release time.

3. The system according to claim 1, wherein the first continuous desiccant unit has a lower density than the batch desiccant material of the first batch desiccant unit.

4. The system according to claim 1, further comprising:
  a controller comprising:
    a plurality of sensors;
    a plurality of motors; and
    a microcontroller coupled to the plurality of sensors and the plurality of motors, the microcontroller being configured to:
      determine a selected water production rate based on at least one signal received from at least one of the plurality of sensors; and
      maximize the water production rate of the at least one condenser unit by adjusting a speed of at least one of the plurality of motors in response to the selected water production rate.

5. The system according to claim 1, further comprising:
a second continuous desiccant unit comprising:
  a second adsorption zone configured to receive the regeneration fluid from the regeneration fluid pathway and from the at least one condenser unit; and
  a second desorption zone configured to receive the regeneration fluid from the regeneration fluid pathway and from the desorption zone of the first continuous desiccant unit.

6. The system according to claim 5, wherein the regeneration inlet of the first batch desiccant unit is configured to receive at least a third portion of the regeneration fluid, and wherein the at least a third portion comprises regeneration fluid exiting the second adsorption zone of the second continuous desiccant unit during the first release time or regeneration fluid exiting the second desorption zone of the second continuous desiccant unit during the first release time.

7. The system according to claim 1, wherein the second temperature is less than 30 degrees Celsius greater than the ambient temperature.

8. The system according to claim 1, wherein:
the regeneration inlet is configured to receive the regeneration fluid; and
a heat flow of the regeneration fluid when the regeneration inlet of the first batch desiccant unit receives the regeneration fluid is less than 500 Watts.

9. The system according to claim 1, wherein the regeneration fluid pathway is configured to receive the batch output fluid output by the batch desiccant outlet from the batch desiccant volume in advance of the at least one condenser unit during the first release time.

10. The system according to claim 1, wherein the at least one condenser unit is configured to at least one of:
receive the batch output fluid output by the batch desiccant outlet from the batch desiccant volume during the first release time; and
produce the liquid water from the batch output fluid output by the batch desiccant outlet from the batch desiccant volume.

11. The system according to claim 1, wherein the first load time comprises a first time duration corresponding to a nighttime environmental condition and the first release time comprises a second time duration corresponding to a daytime environmental condition.

12. The system according to claim 1, wherein the desiccant housing comprises a heat transfer surface configured to transfer heat from the regeneration fluid to the batch desiccant material.

13. The system according to claim 1, wherein the desiccant housing comprises one or more openings configured to transfer at least a second portion of the regeneration fluid from the regeneration fluid pathway into the batch desiccant volume.

14. The system according to claim 1, further comprising a vacuum pump operatively coupled to the batch desiccant volume, wherein the vacuum pump is configured to at least one of:
establish a low pressure condition in the batch output fluid conduit; and
increase a partial pressure of water in the batch output fluid conduit during the first release time.

15. The system according to claim 1, further comprising:
a second batch desiccant unit comprising:
a second regeneration inlet configured to input at least a second portion of the regeneration fluid in the regeneration fluid pathway during a second release time; and
a second batch desiccant housing defining a second batch desiccant volume, the second batch desiccant housing comprising:
a second batch desiccant inlet configured to input the ambient air to the second batch desiccant volume during second load time;
a second batch desiccant outlet configured to output a second batch output fluid from the second batch desiccant volume to a second batch output fluid conduit during the second release time; and
a second batch desiccant material retained within the second batch desiccant volume.

16. The system according to claim 15, wherein the first release time and the second release time occur in an alternating manner.

17. The system according to claim 15, wherein the first release time and second release time comprise time durations corresponding to a daytime environmental condition.

18. A system operable to extract water from ambient air, the system comprising:
a regeneration fluid pathway configured to receive a regeneration fluid;
a thermal unit configured to receive the regeneration fluid from the regeneration fluid pathway and to heat the regeneration fluid when the regeneration fluid is received in the thermal unit;
a continuous desiccant unit comprising:
an adsorption zone configured to receive the ambient air, the ambient air being at an ambient temperature; and
a desorption zone configured to receive the regeneration fluid from the regeneration fluid pathway;
multiple batch desiccant units, each of the multiple batch desiccant units comprising:
a regeneration inlet configured to receive at least a portion of the regeneration fluid from the regeneration fluid pathway during a batch release time; and
a batch desiccant housing defining a batch desiccant volume, the batch desiccant housing comprising:
a batch desiccant inlet configured to input the ambient air to the batch desiccant volume during a batch load time;
a batch desiccant outlet configured to output a batch output fluid from the batch desiccant volume to a batch output fluid conduit during the batch release time; and
a batch desiccant material retained within the batch desiccant volume; and
at least one condenser unit configured to produce liquid water from the regeneration fluid and the batch output fluid;
wherein:
the system is configured to maximize a water production rate of the at least one condenser unit by varying the batch load time and batch release time of the multiple batch desiccant units.

19. A method to extract water from ambient air, the method comprising:
heating, by a thermal unit, a regeneration fluid;
moving a zone of a continuous desiccant unit between the ambient air and the regeneration fluid;
inputting the ambient air to a first batch desiccant unit during a first batch load time;
inputting at least a first portion of the regeneration fluid to the first batch desiccant unit during a first batch release time;
outputting a first batch output fluid from the first batch desiccant unit to a first batch output fluid conduit during the first batch release time;
condensing, by at least one condenser unit, water vapor from the regeneration fluid and the first batch output fluid conduit to produce liquid water from the regeneration fluid; and
maximizing a liquid water production rate of the at least one condenser unit.

20. The method according to claim 19, wherein maximizing the liquid water production rate of the at least one condenser unit comprises controlling a rate of moving the zone of the continuous desiccant unit between the ambient air and the regeneration fluid.

21. The method according to claim 20, wherein controlling the rate of moving the zone of the continuous desiccant unit between the ambient air and the regeneration fluid comprises controlling the rate of moving the zone of the continuous desiccant unit between the ambient air and the regeneration fluid based on at least one of an ambient air temperature of the ambient air, ambient air relative humidity of the ambient air, or a level of solar insolation.

22. The method according to claim 19, wherein the method further comprises receiving a signal generated by at least one of a plurality of sensors.

23. The method according to claim 19, wherein maximizing the liquid water production rate of the at least one condenser unit comprises maximizing the liquid water production rate of the at least one condenser unit based on an amount of heat carried by the regeneration fluid.

24. The method according to claim 19, wherein maximizing the liquid water production rate of the at least one condenser unit comprises varying the first batch load time and the first batch release time.

25. The method according to claim 19, further comprising:
  inputting ambient air to a second batch desiccant unit during a second batch load time;
  inputting at least a second portion of the regeneration fluid to the second batch desiccant unit during a second batch release time; and
  outputting a second batch output fluid from the second batch desiccant unit to a second batch output fluid conduit during the second batch release time.

26. The method according to claim 25, wherein the first batch release time and the second batch release time occur in an alternating manner.

27. The method according to claim 19, further comprising pumping a gas in the first batch output conduit to form a low pressure condition in the first batch output fluid conduit.

28. The method according to claim 27, wherein pumping the gas in the first batch output conduit to form the low pressure condition in the first batch output fluid conduit occurs during the first batch release time.

29. The method according to claim 28, wherein a pressure in the first batch output fluid conduit during the low pressure condition is less than 1 atmosphere.

30. The method according to claim 29, further comprising detecting that a pressure of gases in the first batch output fluid conduit is below a predetermined minimum pressure value.

31. The method according to claim 30, further comprising transitioning, in response to the detecting that the pressure of the gases in the first batch output fluid conduit is below the predetermined minimum pressure value, from outputting the first batch output fluid from the first batch desiccant unit to the first batch output fluid conduit during the first batch release time to inputting the ambient air to the first batch desiccant unit during the first batch load time.

* * * * *